(12) United States Patent
Yang et al.

(10) Patent No.: US 12,192,290 B2
(45) Date of Patent: Jan. 7, 2025

(54) DATA TRANSMISSION METHOD AND COMMUNICATIONS DEVICE

(71) Applicant: HUAWEI TECHNOLOGIES CO., LTD., Guangdong (CN)

(72) Inventors: Jiao Yang, Xi'an (CN); Yan Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/531,119

(22) Filed: Nov. 19, 2021

(65) Prior Publication Data
US 2022/0078247 A1 Mar. 10, 2022

Related U.S. Application Data

(63) Continuation of application No. 16/587,360, filed on Sep. 30, 2019, now Pat. No. 11,196,821, which is a
(Continued)

(51) Int. Cl.
H04L 67/148 (2022.01)
H04L 47/10 (2022.01)
H04L 47/193 (2022.01)
H04W 4/20 (2018.01)
H04W 8/04 (2009.01)

(52) U.S. Cl.
CPC ............ H04L 67/148 (2013.01); H04L 47/15 (2013.01); H04L 47/193 (2013.01); H04W 4/20 (2013.01); H04W 8/04 (2013.01)

(58) Field of Classification Search
CPC ............ H04L 29/08639; H04L 67/148; H04L 65/1083
See application file for complete search history.

(56) References Cited

U.S. PATENT DOCUMENTS 7,251,745 B2 * 7/2007 Koch .................... H04L 69/163
714/4.11
9,338,192 B1 5/2016 He et al.
(Continued)

FOREIGN PATENT DOCUMENTS

CN 1859728 11/2006
CN 101001198 7/2007
(Continued)

OTHER PUBLICATIONS

Extended European Search Report issued in European Application No. 17903723.9 on Dec. 11, 2019, 5 pages.
(Continued)

Primary Examiner — Esther B. Henderson
(74) Attorney, Agent, or Firm — Fish & Richardson P.C.

(57) ABSTRACT

This application provides a data transmission method and communications devices. In some implementations, a terminal device receives, from a first server, first indication information indicating a sequence number of data that is of an application and that has been received by the first server from the terminal device. After a connection between the terminal device and a second server is established, the terminal device transmits data of the application through the connection between the terminal device and the second server according to the first indication information.

18 Claims, 14 Drawing Sheets

Related U.S. Application Data continuation of application No. PCT/CN2017/078853, filed on Mar. 30, 2017.

(56) References Cited

U.S. PATENT DOCUMENTS

| | | | |
|---|---|---|---|
| 10,348,836 | B2 | 7/2019 | Bolton et al. |
| 2002/0085719 | A1 | 7/2002 | Crosbie |
| 2006/0253575 | A1 | 11/2006 | Carter et al. |
| 2009/0116433 | A1 | 5/2009 | Motegi et al. |
| 2009/0254775 | A1* | 10/2009 | Coffey ............... H04L 69/40 714/E11.071 |
| 2010/0254306 | A1 | 10/2010 | Kitaji et al. |
| 2011/0078313 | A1* | 3/2011 | Radulescu .......... H04L 45/125 709/227 |
| 2012/0036269 | A1 | 2/2012 | Kasuga et al. |
| 2012/0158814 | A1* | 6/2012 | Sabiwalsky ............ G06F 9/54 709/201 |
| 2012/0226802 | A1 | 9/2012 | Wu et al. |
| 2013/0290494 | A1 | 10/2013 | Goudarzi et al. |
| 2015/0106420 | A1 | 4/2015 | Warfield et al. |
| 2015/0163163 | A1 | 6/2015 | Kato et al. |
| 2015/0365483 | A1 | 12/2015 | Xiong et al. |
| 2018/0241825 | A1 | 8/2018 | Bolton et al. |

FOREIGN PATENT DOCUMENTS

| | | |
|---|---|---|
| CN | 101258697 | 9/2008 |
| CN | 101411141 | 4/2009 |
| CN | 101572922 | 11/2009 |
| CN | 101583165 | 11/2009 |
| CN | 104170346 | 3/2018 |
| EP | 1453342 | 9/2004 |
| WO | 2016095998 | 6/2016 |

OTHER PUBLICATIONS

Huitema, "Multi-homed TCP", draft-huitema-multi-homed-1.IETF, May 1995, 18 pages.

Office Action issued in Chinese Application No. 201780088036.1 on Mar. 2, 2020, 19 pages (With English Translation).

PCT International Search Report and Written Opinion in International Application No. PCT/CN2017/078,853, dated Dec. 14, 2017, 19 pages (with English Translation).

* cited by examiner

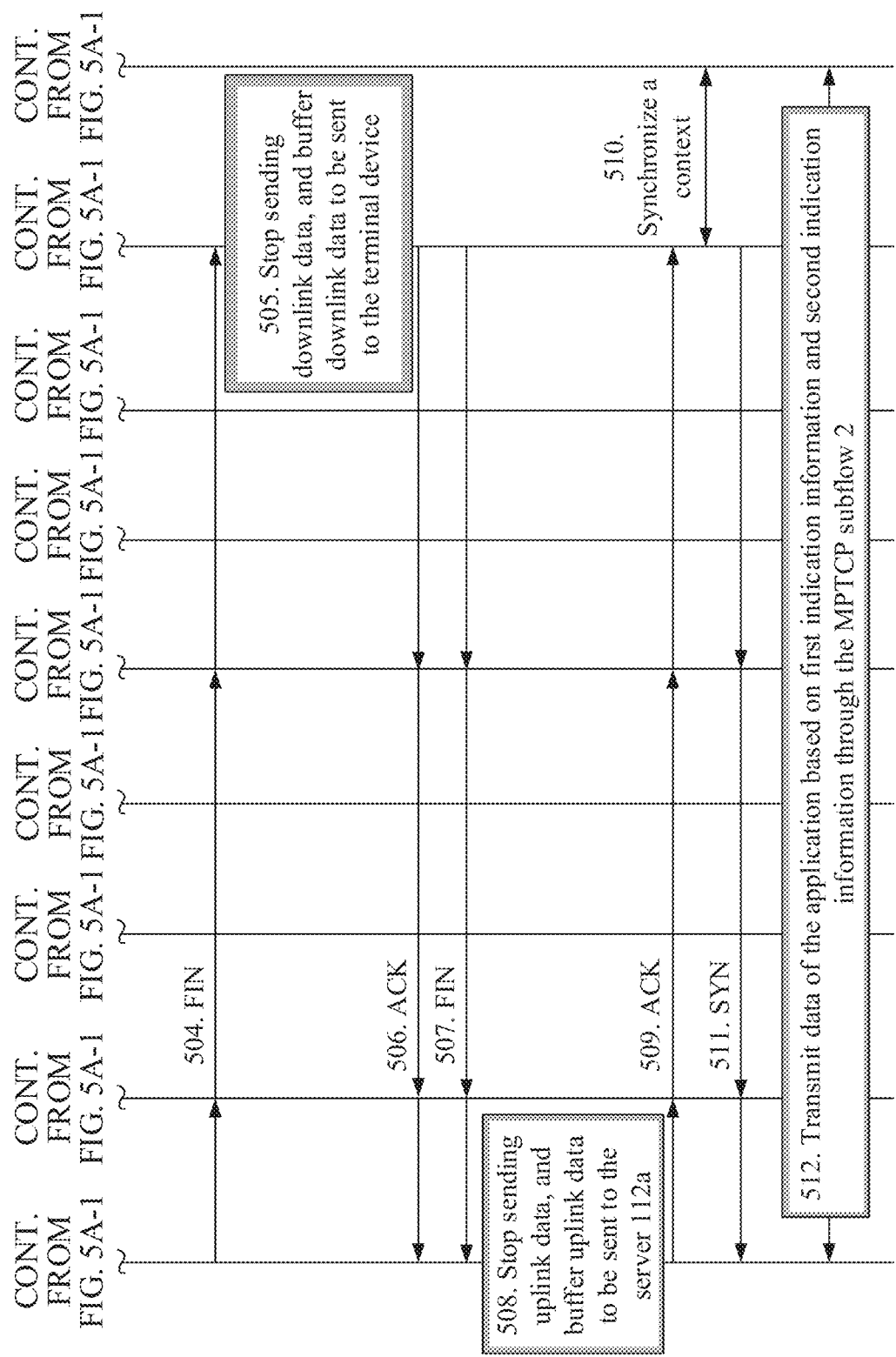

DATA TRANSMISSION METHOD AND COMMUNICATIONS DEVICE

CROSS-REFERENCE TO RELATED APPLICATIONS

This application is a continuation of U.S. patent application Ser. No. 16/587,360, filed on Sep. 30, 2019, which is a continuation of International Application No. PCT/CN2017/078853, filed on Mar. 30, 2017. All of the afore-mentioned patent applications are hereby incorporated by reference in their entireties.

TECHNICAL FIELD

This application relates to the field of wireless communications technologies, and in particular, to a data transmission method and a communications device.

BACKGROUND

Currently, servers are separately configured in different areas for some applications having a relatively high requirement on a transmission delay such as a video or an online game, so that user equipment (UE) selects an adjacent server to transmit data of the application. However, for UE with relatively high mobility, when the UE moves from a service area of a source server to a service area of a target server, in some cases, the UE still transmits data of the application to the source server that is relatively close to the UE before moving, but does not transmit the data of the application by using the target server that is relatively close to the UE after moving. If the data of the application transmitted between the UE and the source server is switched to be transmitted between the UE and the target server, the UE needs to first release a connection between the UE and the source server, and then re-establish a connection between the UE and the target server. This process may cause poor service continuity and affect user experience.

Therefore, migrating the data of the application that is transmitted by using the source server to the target server on the premise of ensuring service continuity becomes an urgent problem to be resolved.

SUMMARY

This application describes a data transmission method and a communications device.

According to one aspect, an embodiment of this application provides a data transmission method, and the method includes: sending, by a first device, a first message to a second device, where the first message is used to instruct the second device to stop sending data of an application to the first device; receiving, by the first device, first indication information from the second device, where the first indication information is used to indicate a sequence number of data that is of the application and that has been received by the second device from the first device; and sending, by the first device, second indication information to the second device, where the second indication information is used to indicate a sequence number of data that is of the application and that has been received by the first device from the second device, where the first device is a terminal device and the second device is a first server, or the first device is a first server and the second device is a terminal device After a connection between the terminal device and a second server is established, the first indication information and the second indication information are used to transmit the data of the application through the connection. For example, the connection includes a transmission control protocol TCP connection or a multipath transmission control protocol MPTCP subflow.

According to the solution provided in this embodiment, for example, after the terminal device or the first server learns of that the first server does not meet a condition of providing the application for the terminal device after the terminal device moves, the terminal device and the first server provide a sequence number of received data of the application for each other through interaction. After the connection is established between the terminal device and the second server, the terminal device may transmit the data of the application through the newly established connection based on the obtained data sequence number of the application. In this way, the application provided by the first server may be migrated to the second server. In addition, in data transmission of the application performed through the connection between the terminal device and the second server, because the sequence number of the data that is of the application and that has been received by the terminal device and the sequence number of data that is of the application and that has been received by the first server before the server is switched for the terminal device are considered, service continuity can be ensured, and user experience of the terminal device is improved.

In a possible design, the method further includes: learning of, by the first device, that the first server does not meet a condition of providing the application for the terminal device, and learning of the second server that can provide the application for the terminal device. For example, the condition includes at least one of the following conditions: a delay of transmitting the data of the application between the terminal device and the first server is less than or equal to a first value; and a packet loss rate of transmitting the data of the application between the terminal device and the first server is less than or equal to a second value. Therefore, when the delay or packet loss rate of transmitting the data of the application between the terminal device and the first server is higher than a specific value, the first device may be triggered to learn of that the first server does not meet the condition of providing the application for the terminal device.

In a possible design, the learning of, by the first device, the second server that can provide the application for the terminal device includes: querying, by the first device, a domain name system DNS to learn of that the second server can provide the application and to obtain address information of the second server.

In a possible design, after the learning of, by the first device, that the first server does not meet a condition of providing the application for the terminal device, the method further includes: buffering, by the first device, data to be sent to the second device.

In a possible design, the second indication information further includes the address information of the second server. Therefore, the second indication information may be used to notify the second device of the address information of the second server.

In a possible design, if the first device is the terminal device and the second device is the first server, the method further includes: receiving, by the terminal device, a second message from the first server or the second server, where the second message is used to trigger the terminal device to transmit the data of the application with the second server through the connection based on the first indication information and the second indication information.

In a possible design, if the first device is the first server and the second device is the terminal device, the method further includes: synchronizing, by the first server, a context of the terminal device with the second server, where the context of the terminal device includes the first indication information and the second indication information.

According to another aspect, an embodiment of this application further provides a data transmission method, and the method includes: receiving, by a second device, a first message from a first device, where the first message is used to instruct the second device to stop sending data of an application to the first device; stopping, by the second device, sending the data of the application to the first device, sending first indication information to the first device, where the first indication information is used to indicate a sequence number of data that is of the application and that has been received by the second device from the first device; and receiving second indication information from the first device, where the second indication information is used to indicate a sequence number of data that is of the application and that has been received by the first device from the second device, where the first device is a terminal device and the second device is a first server, or the first device is a first server and the second device is a terminal device. After a connection between the terminal device and a second server is established, the first indication information and the second indication information are used to transmit the data of the application through the newly established connection. For example, the connection includes a TCP connection or an MPTCP subflow.

According to the solution provided in this embodiment, for example, after the terminal device or the first server learns of that the first server does not meet a condition of providing the application for the terminal device after the terminal device moves, the terminal device and the first server provide a sequence number of received data of the application for each other through interaction. After the connection is established between the terminal device and the second server, the terminal device may transmit the data of the application through the newly established connection based on the obtained data sequence number of the application. In this way, the application provided by the first server may be migrated to the second server. In addition, in data transmission of the application performed through the connection between the terminal device and the second server, because the sequence number of data that is of the application and that has been received by the terminal device and the sequence number of data that is of the application and that has been received by the first server before the server is switched for the terminal device are considered, service continuity can be ensured, and user experience of the terminal device is improved.

In a possible design, after the receiving, by a second device, a first message from a first device, the method further includes: buffering, by the second device, data to be sent to the first device.

In a possible design, the method further includes: learning of, by the second device, address information of the second server. For example, the foregoing second indication information further carries the address information of the second server, and the second device learns of the address information of the second server from the second indication information; or after receiving the first message, the second device queries a domain name system DNS to learn of that the second server can provide the application for the terminal device and to obtain the address information of the second server.

In a possible design, if the first device is the terminal device and the second device is the first server, the method further includes: synchronizing, by the first server, a context of the terminal device with the second server, where the context of the terminal device includes the first indication information and the second indication information. In addition, the method further includes: after the synchronizing, by the first server, a context of the terminal device with the second server, sending, by the first server, a second message to the terminal device, where the second message is used to trigger the terminal device to transmit the data of the application with the second server through the connection.

In a possible design, if the first device is the first server and the second device is the terminal device, the method further includes: receiving, by the terminal device, a second message from the first server or the second server, where the second message is used to trigger the terminal device to transmit the data of the application with the second server through the connection.

According to still another aspect, an embodiment of this application provides a communications device (for example, a terminal device or a server), and the communications device has a function of implementing behavior of the first device in the foregoing method. The function may be implemented by hardware, or may be implemented by hardware by executing corresponding software. The hardware or the software includes one or more modules corresponding to the foregoing function. In a possible design, a structure of the communications device includes a processor and a transceiver, where the processor is configured to process a corresponding function performed by the communications device in the foregoing method. The transceiver is configured to implement communication between the communications device and the second device. The communications device may further include a memory, where the memory is configured to couple to the processor, and stores a program instruction and data that are necessary for the communications device.

According to yet another aspect, an embodiment of this application provides a communications device (for example, a server or a terminal device), and the communications device has a function of implementing behavior of the second device in the foregoing method. The function may be implemented by hardware, or may be implemented by hardware by executing corresponding software. The hardware or the software includes one or more modules corresponding to the foregoing function. In a possible design, a structure of the communications device includes a processor and a transceiver, where the processor is configured to process a corresponding function performed by the communications device in the foregoing method. The transceiver is configured to implement communication between the communications device and the first device. The short message functional entity device may further include a memory, where the memory is configured to couple to the processor, and stores a program instruction and data that are necessary for the short message functional entity device.

According to still yet another aspect, an embodiment of this application provides a computer readable storage medium. The computer readable storage medium stores an instruction, and when the instruction runs on a computer, the computer performs the methods of the foregoing aspects.

According to a further aspect, an embodiment of this application provides a computer program product including an instruction. When the instruction runs on a computer, the computer performs the methods of the foregoing aspects.

According to the solution provided in this embodiment, for example, after the terminal device or the first server learns of that the first server does not meet a condition of providing the application for the terminal device after the terminal device moves, the terminal device and the first server provide a sequence number of received data of the application for each other through interaction. After the connection is established between the terminal device and the second server, the terminal device may transmit the data of the application through the newly established connection based on the obtained data sequence number of the application. In this way, the application provided by the first server may be migrated to the second server. In addition, in data transmission of the application performed through the connection between the terminal device and the second server, because the sequence number of data that is of the application and that has been received by the terminal device and the sequence number of data that is of the application and that has been received by the first server before the server is switched for the terminal device are considered, service continuity can be ensured, and user experience of the terminal device is improved.

DESCRIPTION OF DRAWINGS

To describe embodiments of this application more clearly, the following briefly introduces the accompanying drawings required for describing the embodiments.

FIG. 4A and FIG. 4B and FIG. 5A-1 and FIG. 5A-2 are diagrams of signaling interaction of a data transmission method according to an embodiment of this application;

DESCRIPTION OF EMBODIMENTS

The following describes technical solutions in embodiments of this application with reference to accompanying drawings in the embodiments of this application.

Figure 1:
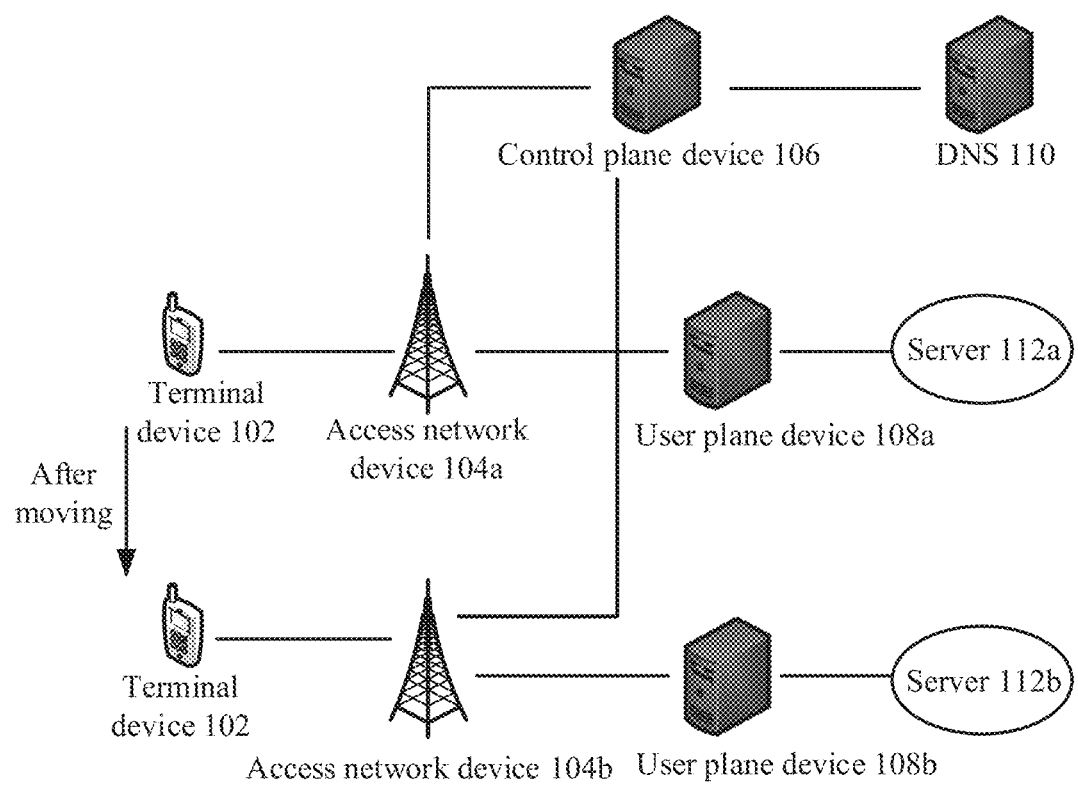
FIG. 1 is a schematic diagram of a communications system according to an embodiment of this application.

The embodiments of this application provide a solution based on a communications system shown in FIG. 1, and the solution may be applicable to a next-generation mobile network (such as a 5G network) architecture. For example, in the 5G mobile network architecture, a control plane and a forwarding plane of a mobile gateway are functionally decoupled, and a separated control plane function is combined with a conventional control network element MME of a third generation partnership project (3GPP), a policy and charging rules function (PCRF), and the like to form a unified control plane (CP) device. A user plane (UP) device can implement user plane functions (SGW-U and PGW-U) of a serving gateway (SGW) and a packet data network gateway (PGW).

In addition, the embodiments of this application may be further applicable to another future-proofed communications technology. The technical solutions provided in the embodiments of this application are applicable to a communications system provided that the communications system that uses a new communications technology includes a server that can provide an application for a terminal device. The system architecture and the service scenario described in the embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new service scenarios, the technical solutions provided in the embodiments of this application are also applicable to similar technical problems.

As shown in FIG. 1, an embodiment of this application provides a communications system. For example, the communications system includes terminal devices 102, access network devices 104a and 104b, a control plane device 106, user plane devices 108a and 108b, a domain name system (DNS) 110, and servers 112a and 112b.

The terminal device 102 in the embodiments of this application may include various handheld devices, in-vehicle devices, wearable devices, or computing devices that have a wireless communication function, or other processing devices connected to a wireless modem. The terminal device may also be referred to as user equipment (UE), a mobile station (MS), a terminal, and may include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL), a machine type communication (MTC) terminal, and the like.

The access network device 104a or 104b in this embodiment of this application is an apparatus that is deployed in a radio access network and that is configured to provide a wireless communication function for the terminal device 102. The access network device may include various forms of base stations, such as a macro base station, a micro base station (also referred to as a small cell), a relay station, and an access point. In systems that use different radio access technologies, names of a device that has a base station function may be different. For example, in an LTE system, the device is referred to as an evolved NodeB (eNB or eNodeB), and in a 3rd generation (3G) system, the device is referred to as a NodeB.

The control plane device 106 in this embodiment of this application may be responsible for attachment of the terminal device, mobility management, a tracking area update procedure, session management of the terminal device, selection of a user plane device (for example, the user plane device 108a or 108b), reselection of the user plane device, Internet Protocol (IP) address allocation, quality of service (QOS) control, establishment, modification, and release of a resource, and the like.

The user plane device 108a or 108b in this embodiment of this application may be responsible for processing functions such as packet forwarding and statistics collection of the terminal device. For example, the user plane device may implement user plane functions of the SGW and the PGW. The user plane device may further be a software-defined network (SDN) switch.

The DNS 110 in this embodiment of this application is a database in which domain names and IP addresses are mapped to each other. An IP address corresponding to a domain name may be obtained by querying the DNS.

The server 112a or 112b in this embodiment of this application may be responsible for providing application services for various services of the terminal device. The server may also be referred to as an application server (AS), an application management platform, or a mobile edge computing (MEC) platform.

In the communications system shown in FIG. 1, when the terminal device 102 is in a first area, the terminal device 102 may exchange data of an application with the server 112a by using the access network device 104a and the user plane device 108a, to obtain the application provided by the server 112a. In addition, the server 112b can also provide the application. According to the solution of this application, after moving from the first area to a second area, the terminal device 102 may exchange the data of the application with the server 112b by using the access network device 104b and the user plane device 108b, to obtain a same service and ensure service continuity.

An embodiment of the present invention discloses a data transmission method, and the method includes:

sending, by a first device, a first message to a second device, where the first message is used to instruct the second device to stop sending data of an application to the first device;

receiving, by the first device, first indication information from the second device, where the first indication information is used to indicate a sequence number of data that is of the application and that has been received by the second device from the first device; and sending, by the first device, second indication information to the second device, where the second indication information is used to indicate a sequence number of data that is of the application and that has been received by the first device from the second device, where the first device is a terminal device (for example, a terminal device 102) and the second device is a first server (for example, a server 112a), or the first device is a first server (for example, the server 112a) and the second device is a terminal device (for example, the terminal device 102). After a connection between the terminal device 102 and the second server (for example, a server 112b) is established, the first indication information and the second indication information are used to transmit the data of the application through the connection.

Figure 2:
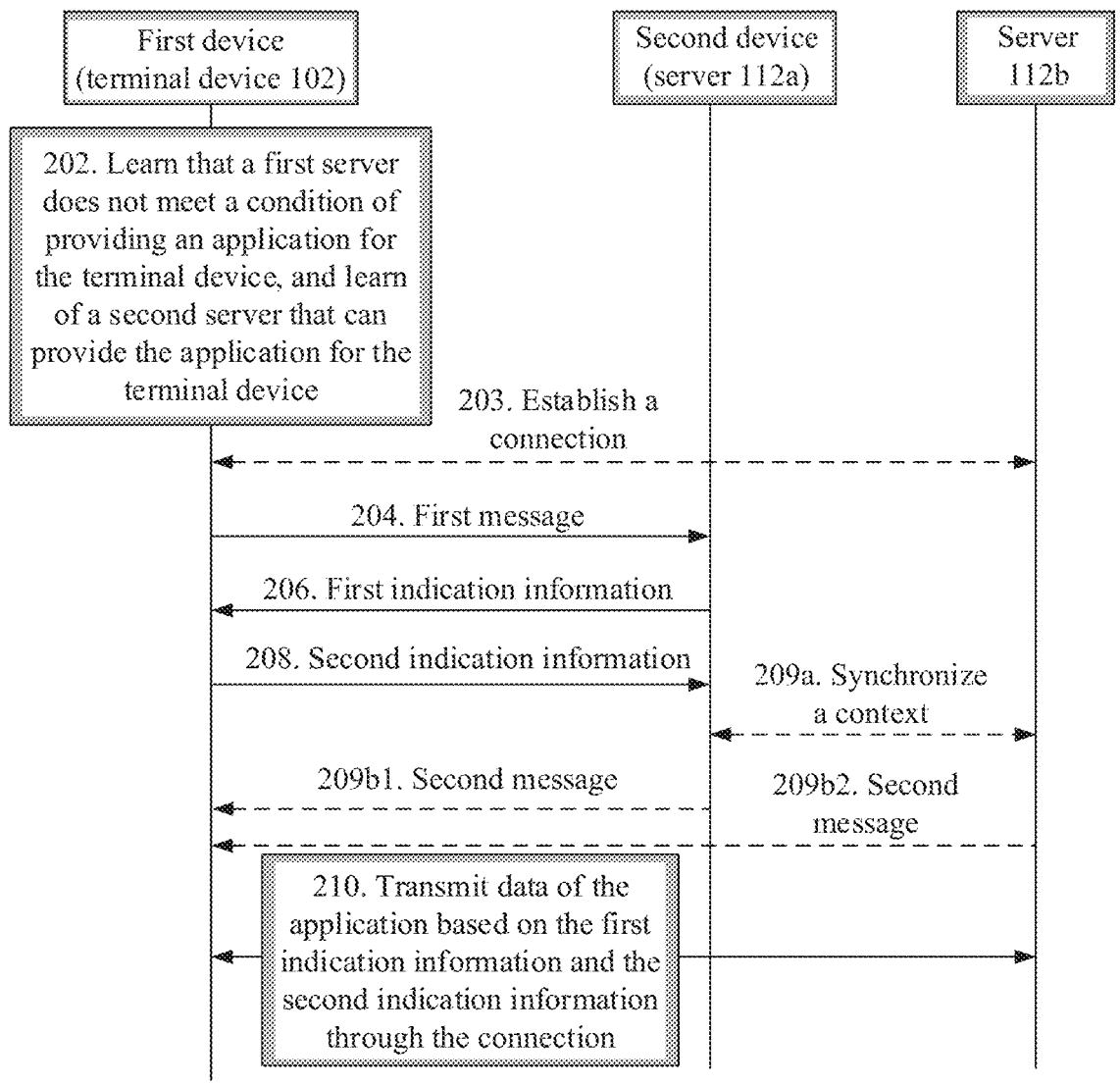
FIG. 2 and FIG. 3 are schematic flowcharts of a data transmission method according to an embodiment of this application.
Figure 3:
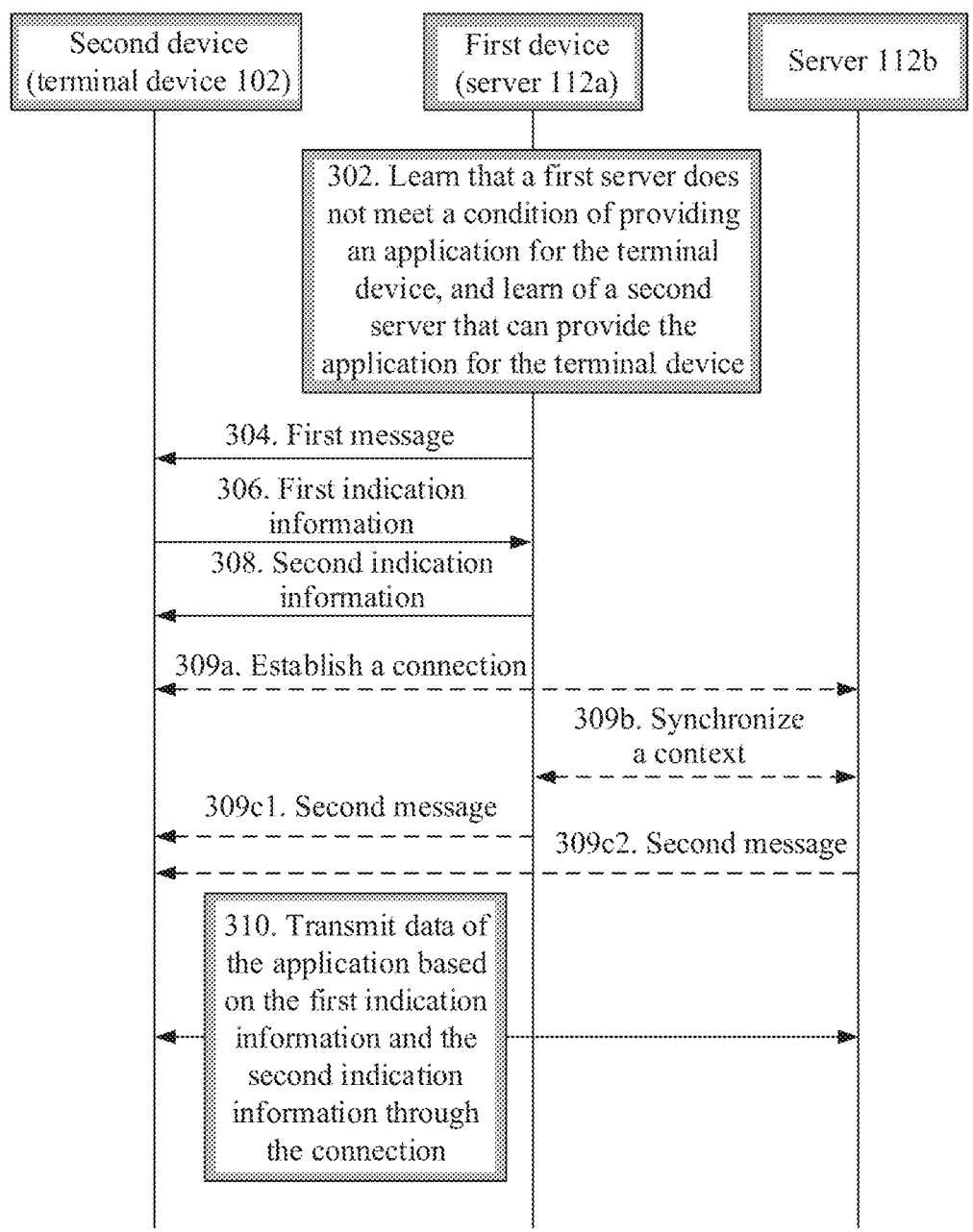

The following describes the data transmission method provided in this embodiment of this application with reference to FIG. 2 and FIG. 3. FIG. 2 is applicable to a scenario in which the first device is the terminal device 102, and the second device is the first server 112a. In this case, the foregoing method may be implemented by using step 204, step 206, step 208, step 210, and the like in FIG. 2. In other words, instructing a peer end to stop sending data is performed by the terminal device 102. FIG. 3 is applicable to a scenario in which the first device is the first server 112a, and the second device is the terminal device 102. In this case, the foregoing method may be implemented by using step 304, step 306, step 308, step 310, and the like in FIG. 3. In other words, instructing a peer end to stop sending data is performed by the first server 112a. The following is described with reference to FIG. 2 and FIG. 3.

In an example of FIG. 2, the data transmission method provided in this application includes the following steps.

In step 202, the terminal device 102 learns of that the first server (for example, the server 112a) does not meet a condition of providing the application for the terminal device, and learns of the second server (for example, the server 112b) that can provide the application for the terminal device.

For example, the server 112a is configured to provide the application for the terminal device 102 in a first area. After the terminal device 102 moves from the first area to a second area, the terminal device 102 first determines whether the server 112a meets the condition of providing the application for the terminal device 102. The condition includes but is not limited to at least one of the following conditions: a delay of transmitting data of the application between the terminal device 102 and the server 112a is less than or equal to a first value; and a packet loss rate of transmitting the data of the application between the terminal device 102 and the server 112a is less than or equal to a second value. For example, the terminal device 102 detects, periodically or in real time, the delay or the packet loss rate of transmitting the data of the application between the terminal device 102 and the server 112a. If the delay of transmitting the data of the application between the terminal device 102 and the server 112a is greater than the first value, or the packet loss rate of transmitting the data of the application between the terminal device 102 and the server 112a is greater than the second value, it may be determined that the server 112a no longer meets the condition of providing the application for the terminal device 102. If the terminal device 102 determines that the server 112a no longer meets the condition of providing the application for the terminal device 102, the terminal device 102 learns of that another server may provide the application for the terminal device 102.

For example, the terminal device 102 queries a DNS to learn of that the second server (for example, the server 112b) can provide the application and to obtain address information of the server 112b. For example, the terminal device 102 queries the DNS based on location information of the terminal device, to obtain the address information of the server 112b.

If the server 112a still meets the condition of providing the application for the terminal device 102, the terminal device continues to access the server 112a to transmit uplink data and/or downlink data with the server 112a. This is not shown in the figure.

In step 204, the terminal device 102 sends a first message to the server 112a, where the first message is used to instruct the server 112a to stop sending downlink data of the application to the terminal device 102. Correspondingly, after receiving the first message, the server 112a stops sending the downlink data of the application to the terminal device 102. In addition, optionally, after receiving the first message, the server 112a buffers downlink data to be sent to the terminal device 102.

For example, the first message is a FIN message. The FIN message may also be referred to as a FIN packet. Optionally, the first message may carry an indicator, and the indicator is used to instruct the server 112a to stop sending downlink data of the application to the terminal device 102.

In step 206, the server 112a sends first indication information to the terminal device 102, where the first indication information is used to indicate a sequence number of uplink data that is of the application and that has been received by the server 112a from the terminal device 102. Correspondingly, the terminal device 102 receives the first indication information from the server 112a.

For example, the first indication information may be sent by using an ACK message. In other words, the ACK message includes the first indication information. The ACK message may also be referred to as an ACK packet. If the terminal device 102 performs data transmission with the server 112a through a TCP connection before moving to the second area, the sequence number in step 206 is a TCP sequence number of the uplink data that is of the application and that has been received by the server 112a from the terminal device 102. If the terminal device 102 performs data transmission with the server 112a through an MPTCP connection (for example, a subflow subflow 1 of the MPTCP connection) before moving to the second area, the sequence number in step 206 is an MPTCP sequence number of the uplink data that is of the application and that has been received by the server 112a from the terminal device 102.

Optionally, the server 112a further sends a FIN message to the terminal device 102, to instruct the terminal device 102 to stop sending the uplink data of the application to the server 112a. Correspondingly, after receiving the FIN message, the terminal device 102 stops sending the uplink data of the application to the server 112a. In addition, optionally, after receiving the FIN message, the terminal device 102 buffers uplink data to be sent to the server 112a.

In step 208, the terminal device 102 sends second indication information to the server 112a, where the second indication information is used to indicate a sequence number of downlink data that is of the application and that has been received by the terminal device 102 from the server 112a. Correspondingly, the server 112a receives the second indication information from the terminal device 102. The first indication information and the second indication information may be used to transmit the data of the application through the connection between the terminal device 102 and the server 112b.

For example, the second indication information may be sent by using an ACK message. In other words, the ACK message includes the second indication information. The ACK message may also be referred to as an ACK packet. Similarly, if the terminal device 102 performs data transmission with the server 112a through a TCP connection before moving to the second area, the sequence number in step 208 is a TCP sequence number of the downlink data that is of the application and that has been received by the terminal device 102 from the server 112a. If the terminal device 102 performs data transmission with the server 112a through an MPTCP connection (for example, the subflow subflow 1 of the MPTCP connection) before moving to the second area, the sequence number is an MPTCP sequence number of the downlink data that is of the application and that has been received by the terminal device 102 from the server 112a.

Optionally, the second indication information may further carry the address information of the server 112b.

In the foregoing method, after the terminal device 102 moves and learns of that the server 112a does not meet the condition of providing the application for the terminal device 102, the terminal device 102 learns of the second server that can provide the application for the terminal device. In addition, the terminal device 102 and the server 112a provide a sequence number of received data of the application for each other through interaction. After the connection is established between the terminal device 102 and the second server 112b, the terminal device 102 may transmit the data of the application based on the obtained data sequence number of the application through the connection between the terminal device 102 and the second server 112b. In this way, the application provided by the source server 112a may be migrated to the target server 112b. In addition, in data transmission of the application performed through the connection between the terminal device 102 and the second server 112b, because the sequence number of data that is of the application and that has been received by the terminal device 102 and the sequence number of data that is of the application and that has been received by the first server 112a before the server is switched for the terminal device 102 are considered, service continuity can be ensured, and user experience of the terminal device is improved.

Optionally, before step 204, the connection between the terminal device 102 and the second server (for example, the server 112b) may be established in step 203.

For example, the connection includes the TCP connection or the subflow of the MPTCP connection. For example, if the terminal device 102 performs data transmission with the server 112a through the TCP connection before moving to the second area, in step 203, the terminal device 102 may establish a new TCP connection between the terminal device 102 and the server 112b. If the terminal device 102 performs data transmission with the server 112a through the subflow 1 of the MPTCP connection before moving to the second area, in step 203, the terminal device 102 may establish a new subflow of the MPTCP connection between the terminal device 102 and the server 112b. FIG. 4A and FIG. 4B, FIG. 5A-1 and FIG. 5A-2, and FIG. 5B are used for further description based on different types of the connection. In addition, the connection may be alternatively implemented by using a quick UDP Internet connection (QUIC).

Optionally, in step 209a, the server 112a synchronizes a context of the terminal device with the server 112b.

For example, the server 112a needs to first learn of address information of the server 112b that is to synchronize the context with the server 112a. In an implementation, when the second indication information carries the address information of the server 112b, the server 112a learns of the address information of the server 112b from the received second indication information. In another implementation, the server 112a may alternatively query the DNS after receiving the first message, to learn of that the server 112b can provide the application and to obtain the address information of the server 112b. For example, the server 112a may query the DNS based on location information of the terminal device 102, to obtain the address information of the server 112b. Because both the terminal device 102 and the server 112a query the DNS based on the location information of the terminal device 102, it is ensured that the terminal device 102 and the server 112a obtain the same second server after query, namely, the server 112b.

After learning of the address information of the server 112b, the server 112a may synchronize the context of the terminal device with the server 112b.

For example, the context of the terminal device includes application layer information and transmission status information that are of the terminal device and that are stored in the server 112a. For example, the transmission status information includes window information and sequence numbers. Optionally, the sequence numbers include the sequence number (the first indication information) of the uplink data that is of the application and that has been received by the server 112a from the terminal device 102. In addition, the sequence numbers further include the sequence number (the second indication information) obtained by the server 112a in step 208, of the downlink data that is of the application and that has been received by the terminal device 102 from the server 112*a*. In addition, the context of the terminal device further includes downlink data that is to be sent to the terminal device 102 and that is buffered in the server 112*a*. Optionally, synchronization of the context of the terminal device may be implemented by copying memory of the server 112*a* into the server 112*b*.

After the synchronization is completed, the server 112*a* sends a second message to the terminal device 102 in step 209*b*1. Alternatively, the server 112*b* sends the second message in step 209*b*2. The second message is used to trigger the terminal device 102 to transmit the data of the application with the server 112*b* based on the first indication information and the second indication information through the connection established in step 203. Correspondingly, after receiving the second message, the terminal device 102 transmits, in step 210, the data of the application with the server 112*b* based on the first indication information and the second indication information through the connection established in step 203.

Optionally, the second message is a message used to indicate that the context has been synchronized and trigger the terminal device to send the buffered uplink data. For example, the second message is an indication message (for example, may be referred to as an indication message for triggering buffer sending). Alternatively, the second message includes indication information used to indicate that the context has been synchronized. Optionally, the second message is an SYN message, or may also be referred to as an SYN packet.

In step 210, the terminal device 102 transmits the data of the application based on the first indication information and the second indication information through the connection established in step 203. That the terminal device 102 transmits the data includes at least one of the following: the terminal device 102 sends uplink data to the server 112*b*; and the terminal device 102 receives downlink data from the server 112*b*.

For example, the terminal device 102 may send the buffered uplink data to the server 112*b* through the connection. Because the terminal device 102 has obtained the first indication information (the sequence number of the uplink data that is of the application and that has been received by the server 112*a* from the terminal device 102), and the server 112*b* has obtained the first indication information (the sequence number of the uplink data that is of the application and that has been received by the server 112*a* from the terminal device 102) through synchronization, the terminal device 102 and the server 112*b* may implement uninterrupted uplink data transmission.

For another example, the terminal device 102 may receive, through the connection, the buffered downlink data that is obtained by the server 112*b* through synchronization in step 209*a*. Because the terminal device 102 learns of the second indication information, and the server 112*b* has obtained the second indication information (the sequence number of the downlink data that is of the application and that has been received by the terminal device 102 from the server 112*a*) through synchronization, the terminal device 102 and the server 112*b* may implement uninterrupted downlink data transmission.

In an example of FIG. 3, the data transmission method provided in this application includes the following steps.

In step 302, the server 112*a* learns of that the server 112*a* does not meet a condition of providing the application for a terminal device, and learns of the second server (for example, the server 112*b*) that can provide the application for the terminal device.

For example, the server 112*a* determines whether the server 112*a* meets the condition of providing the application for the terminal device 102. The condition includes but is not limited to at least one of the following conditions: a delay of transmitting data of the application between the terminal device 102 and the server 112*a* is less than or equal to a first value; and a packet loss rate of transmitting the data of the application between the terminal device 102 and the server 112*a* is less than or equal to a second value. For example, the server 112*a* detects, periodically or in real time, the delay or the packet loss rate of transmitting the data of the application between the terminal device 102 and the server 112*a*. After the terminal device 102 moves from a first area to a second area, if the delay of transmitting the data of the application between the terminal device 102 and the server 112*a* is greater than the first value, or the packet loss rate of transmitting the data of the application between the terminal device 102 and the server 112*a* is greater than the second value, the server 112*a* may determine that the server 112*a* no longer meets the condition of providing the application for the terminal device 102. If the server 112*a* determines that the server 112*a* no longer meets the condition of providing the application for the terminal device 102, the server 112*a* learns of that another server may provide the application for the terminal device 102.

For example, the server 112*a* queries a DNS to learn of that the second server (for example, the server 112*b*) can provide the application and to obtain address information of the server 112*b*. For example, the server 112*a* may obtain location information of the terminal device from a control plane device, and query the DNS based on the location information of the terminal device, to obtain the address information of the server 112*b*.

If the server 112*a* still meets the condition of providing the application for the terminal device 102, the terminal device continues to access the server 112*a* to transmit uplink data and/or downlink data with the server 112*a*. This is not shown in the figure.

In step 304, the server 112*a* sends a first message to the terminal device 102, where the first message is used to instruct the terminal device 102 to stop sending uplink data of the application to the server 112*a*. Correspondingly, after receiving the first message, the terminal device 102 stops sending the uplink data of the application to the server 112*a*. In addition, optionally, after receiving the first message, the terminal device 102 buffers uplink data to be sent to the server 112*a*.

For example, the first message is a FIN message. The FIN message may also be referred to as a FIN packet. Optionally, the first message may carry an indicator, and the indicator is used to instruct the terminal device 102 to stop sending the uplink data of the application to the server 112*a*.

In step 306, the terminal device 102 sends first indication information to the server 112*a*, where the first indication information is used to indicate a sequence number of downlink data that is of the application and that has been received by the terminal device 102 from the server 112*a*. Correspondingly, the server 112*a* receives the first indication information from the terminal device 102.

For example, the first indication information may be sent by using an ACK message. In other words, the ACK message includes the first indication information. The ACK message may also be referred to as an ACK packet. If the terminal device 102 performs data transmission with the server 112*a* through a TCP connection before moving to the second area, the sequence number in step 306 is a TCP sequence number of the downlink data that is of the application and that has been received by the terminal device 102 from the server 112a. If the terminal device 102 performs data transmission with the server 112a through an MPTCP connection (for example, a subflow subflow 1 of the MPTCP connection) before moving to the second area, the sequence number is an MPTCP sequence number of the downlink data that is of the application and that has been received by the terminal device 102 from the server 112a.

Optionally, the terminal device 102 further sends a FIN message to the server 112a, to instruct the server 112a to stop sending the downlink data of the application to the terminal device 102. Correspondingly, after receiving the FIN message, the server 112a stops sending the downlink data of the application to the terminal device 102. In addition, optionally, after receiving the FIN message, the server 112a buffers downlink data to be sent to the terminal device 102.

In step 308, the server 112a sends second indication information to the terminal device 102, where the second indication information is used to indicate a sequence number of uplink data that is of the application and that has been received by the server 112a from the terminal device 102. Correspondingly, the terminal device 102 receives the second indication information from the server 112a. The first indication information and the second indication information may be used to transmit the data of the application through the connection between the terminal device 102 and the server 112b.

For example, the second indication information may be sent by using an ACK message. In other words, the ACK message includes the second indication information. The ACK message may also be referred to as an ACK packet. Similarly, if the terminal device 102 performs data transmission with the server 112a through a TCP connection before moving to the second area, the sequence number in step 308 is a TCP sequence number of the uplink data that is of the application and that has been received by the server 112a from the terminal device 102. If the terminal device 102 performs data transmission with the server 112a through an MPTCP connection (for example, a subflow subflow 1 of the MPTCP connection) before moving to the second area, the sequence number is an MPTCP sequence number of the uplink data that is of the application and that has been received by the server 112a from the terminal device 102.

Optionally, the second indication information may further carry the address information of the server 112b.

In the foregoing method, after the server 112a learns of, after the terminal device 102 moves, that the server 112a does not meet the condition of providing the application for the terminal device 102, and learns of the second server that can provide the application for the terminal device, the terminal device 102 and the server 112a provide a sequence number of received data of the application for each other through interaction. After the connection is established between the terminal device 102 and the second server 112b, the terminal device 102 may transmit the data of the application based on the obtained sequence number through the connection between the terminal device 102 and the second server 112b. In this way, the application provided by the source server 112a may be migrated to the target server 112b. In addition, in data transmission of the application performed through the connection between the terminal device 102 and the second server 112b, because the sequence number of data that is of the application and that has been received by the terminal device 102 and the sequence number of data that is of the application and that has been received by the first server 112a are considered, service continuity can be ensured, and user experience of the terminal device is improved.

Optionally, the method further includes: establishing the connection between the terminal device 102 and the second server (for example, the server 112b) in step 309a.

Optionally, before establishing the connection between the terminal device 102 and the server 112b, the terminal device 102 needs to first learn of the address information of the server 112b. In an implementation, when the second indication information carries the address information of the server 112b, the terminal device 102 learns of the address information of the server 112b from the received second indication information. In another implementation, the terminal device 102 may alternatively query the DNS after receiving the first message, to learn of that the server 112b can provide the application and to obtain the address information of the server 112b. For example, the terminal device 102 queries the DNS based on location information of the terminal device, to obtain the address information of the server 112b. Because both the terminal device 102 and the server 112a query the DNS based on the location information of the terminal device 102, it is ensured that the terminal device 102 and the server 112a obtain the same second server after query, namely, the server 112b.

For example, the connection includes the TCP connection or the subflow of the MPTCP connection. For example, if the terminal device 102 performs data transmission with the server 112a through the TCP connection before moving to the second area, the terminal device 102 establishes a new TCP connection between the terminal device 102 and the server 112b. If the terminal device 102 performs data transmission with the server 112a through the subflow 1 of the MPTCP connection before moving to the second area, the terminal device 102 establishes a new subflow of the MPTCP connection between the terminal device 102 and the server 112b. FIG. 6A and FIG. 6B and FIG. 7A and FIG. 7B are used for further description based on different types of the connection. In addition, the connection may be alternatively implemented by using a QUIC connection.

Optionally, in step 309b, the server 112a synchronizes a context of the terminal device with the server 112b.

For example, the context of the terminal device includes application layer information and transmission status information that are of the terminal device and that are stored in the server 112a. For example, the transmission status information includes window information and a sequence numbers. Optionally, the sequence numbers include the sequence number (the first indication information) of the downlink data that is of the application and that has been received by the terminal device 102 from the server 112a. In addition, the sequence numbers further include the sequence number (the second indication information) of the uplink data that is of the application and that has been received by the server 112a from the terminal device 102. In addition, the context of the terminal device further includes downlink data that is to be sent to the terminal device 102 and that is buffered in the server 112a. Optionally, synchronization of the context of the terminal device may be implemented by copying memory of the server 112a into the server 112b.

After the synchronization is completed, the server 112a sends a second message to the terminal device 102 in step 309c1. Alternatively, the server 112b sends the second message in step 309c2. The second message is used to trigger the terminal device 102 to transmit the data of the application with the server 112b based on the first indication information and the second indication information through the connection established in step 309*a*. Correspondingly, after receiving the second message, the terminal device 102 transmits, in step 310, the data of the application with the server 112*b* based on the first indication information and the second indication information through the connection established in step 309*a*.

Optionally, the second message is a message used to indicate that the context has been synchronized, and trigger the terminal device to send the buffered uplink data. For example, the second message is an indication message (for example, may be referred to as an indication message for triggering buffer sending). Alternatively, the second message includes indication information used to indicate that the context has been synchronized. Optionally, the second message is an SYN message, or may also be referred to as an SYN packet.

In step 310, the terminal device 102 transmits the data of the application based on the first indication information and the second indication information through the connection established in step 309*a*. That the terminal device 102 transmits the data includes at least one of the following: the terminal device 102 sends uplink data to the server 112*b*; and the terminal device 102 receives downlink data from the server 112*b*.

For example, the terminal device 102 may send the buffered uplink data to the server 112*b* through the connection. Because the terminal device has obtained the second indication information in step 308, and the server 112*b* has obtained the second indication information (the sequence number of the uplink data that is of the application and that has been received by the server 112*a* from the terminal device 102) through synchronization, the terminal device 102 and the server 112*b* may implement uninterrupted uplink data transmission.

For another example, the terminal device 102 may receive, through the connection, the buffered downlink data that is obtained by the server 112*b* through synchronization in step 309*b*. Because the terminal device 102 learns of the first indication information, the server 112*b* has obtained, in step 306, the sequence number (the first indication information) of the downlink data that is of the application and that has been received by the terminal device 102 from the server 112*a*, and the server 112*b* obtains the first indication information through synchronization in step 309*b*, the terminal device 102 and the server 112*b* may implement uninterrupted downlink data transmission.

Figure 4A:
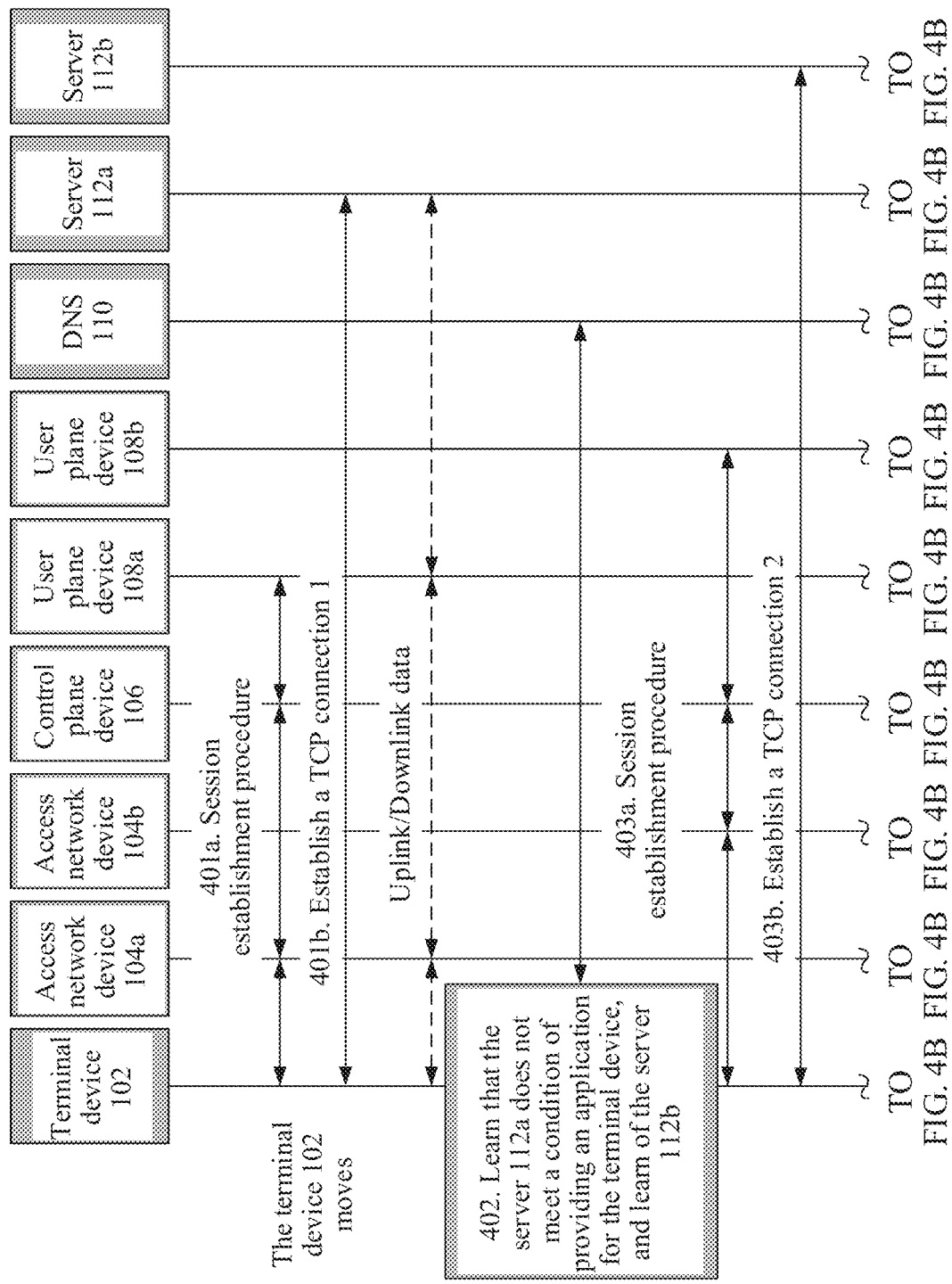
Figure 4B:
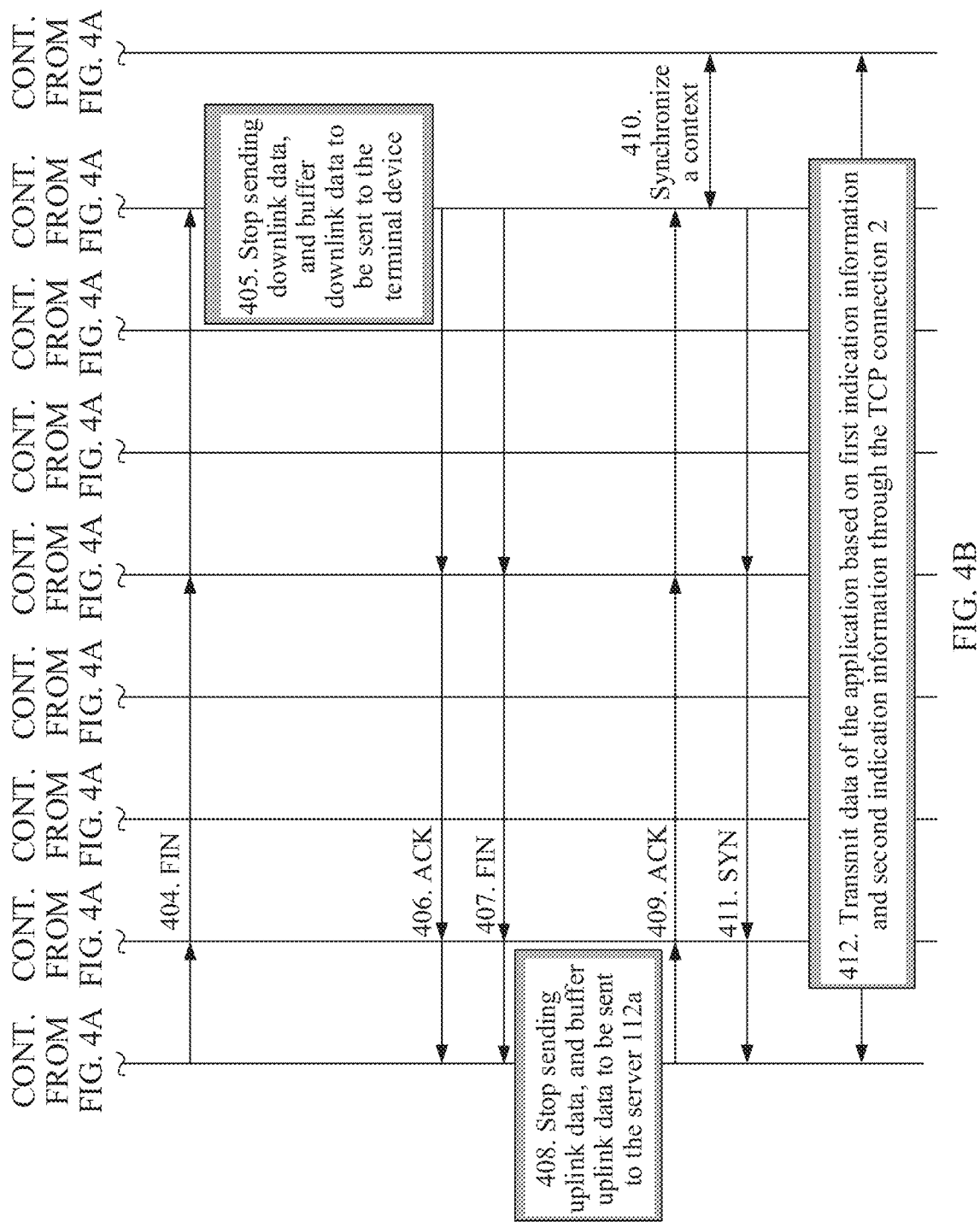

FIG. 4A and FIG. 4B are a signaling flowchart of a data transmission method according to an embodiment of the present invention. As shown in FIG. 4A and FIG. 4B, the method includes the following steps.

Step 401*a*: Execute a session establishment procedure to establish a session (which may also be referred to as a packet data unit (PDU) session) between a terminal device 102 and a user plane device 108*a*. For example, the session establishment procedure relates to interaction between the terminal device 102, an access network device 104*a*, a control plane device 106, and the user plane device 108*a*.

Step 401*b*: Establish a TCP connection 1 between the terminal device 102 and a server 112*a*.

TCP is an end-to-end transmission protocol. After the TCP connection 1 between the terminal device 102 and the server 112*a* is established, the terminal device 102 may transmit uplink data and/or downlink data of an application with the server 112*a*.

Step 402: After the terminal device 102 moves from a first area to a second area, the terminal device 102 learns of that the server 112*a* does not meet a condition of providing the application for the terminal device, and learns of a server 112*b* that can provide the application for the terminal device.

For step 402, refer to description of step 202 in FIG. 2. Details are not described herein again.

Step 403*a*: Execute the session establishment procedure to establish the session between the terminal device 102 and a user plane device 108*b*.

Step 403*b*: Establish a TCP connection 2 between the terminal device 102 and the server 112*b*.

For example, in the foregoing step 402 (refer to description of step 202 in FIG. 2), the terminal device 102 learns of, by querying a DNS, the server 112*b* that can provide the application for the terminal device, and obtains address information of the server 112*b*. In this way, the terminal device 102 may establish the TCP connection 2 between the terminal device 102 and the server 112*b* based on the address information of the server 112*b*. Optionally, in the foregoing step 404*a*, in a session establishment process, a new IP address is allocated to the terminal device 102. In this way, the terminal device 102 may establish the TCP connection 2 between the terminal device 102 and the server 112*b* based on the newly allocated IP address and the address information of the server 112*b*.

Step 404: The terminal device 102 sends a FIN message to the server 112*a*, where the FIN message is used to instruct the server 112*a* to stop sending the downlink data of the application to the terminal device 102.

Correspondingly, in step 405, after receiving the FIN message, the server 112*a* stops sending the downlink data of the application to the terminal device 102, and buffers downlink data to be sent to the terminal device 102.

Step 406: The server 112*a* sends an ACK message carrying first indication information to the terminal device 102, where the first indication information is used to indicate a TCP sequence number of the uplink data that is of the application and that has been received by the server 112*a* from the terminal device 102. Correspondingly, the terminal device 102 receives, from the server 112*a*, the ACK message carrying the first indication information.

Step 407. The server 112*a* sends a FIN message to the terminal device 102, where the FIN message is used to instruct the terminal device 102 to stop sending the uplink data of the application to the server 112*a*.

Correspondingly, in step 408, after receiving the FIN message, the terminal device 102 stops sending the uplink data of the application to the server 112*a*, and buffers uplink data to be sent to the server 112*a*.

Step 409: The terminal device 102 sends an ACK message carrying second indication information to the server 112*a*, where the second indication information is used to indicate a TCP sequence number of the downlink data that is of the application and that has been received by the terminal device 102 from the server 112*a*. Correspondingly, the server 112*a* receives, from the terminal device 102, the ACK message carrying the second indication information.

It should be noted that an execution sequence of step 405 and step 406 is not limited in the present invention. Step 405 may be performed before step 406, or step 405 may be performed after step 406, or step 405 and step 406 may be performed simultaneously. Similarly, an execution sequence of step 408 and step 409 is not limited.

Step 410: The server 112*a* synchronizes a context of the terminal device with the server 112*b*.

Step 411: After context synchronization is completed, the server 112*a* or the server 112*b* sends an SYN message to UE. That the server 112*a* sends the SYN message in FIG. 4B is used as an example. A similar case is applied to that the server 112*b* sends the SYN message to the UE, and this is not shown in the figure.

Step 412: After receiving the SYN message, the terminal device 102 transmits data of the application based on the first indication information and the second indication information through the TCP connection 2 established in step 403*b*.

For step 404 to step 412, refer to description of step 204 to step 210 in FIG. 2. Details are not described herein again.

In the example of FIG. 4A and FIG. 4B, after the terminal device 102 moves and learns of that the server 112*a* does not meet the condition of providing the application for the terminal device 102, the terminal device 102 learns of the second server that can provide the application for the terminal device. In addition, the terminal device 102 and the server 112*a* provide a sequence number of received data of the application for each other through interaction. After the new TCP connection 2 is established between the terminal device 102 and the second server 112*b*, the terminal device 102 may transmit the data of the application through the new TCP connection 2 based on the obtained data sequence number of the application. In this way, the application provided by the source server 112*a* may be migrated to the target server 112*b*. In addition, in data transmission of the application performed through the new TCP connection 2, because the sequence number of data that is of the application and that has been received by the terminal device 102 and the sequence number of data that is of the application and that has been received by the first server 112*a* are considered, service continuity can be ensured, and user experience of the terminal device is improved.

Figures 1, 5A:
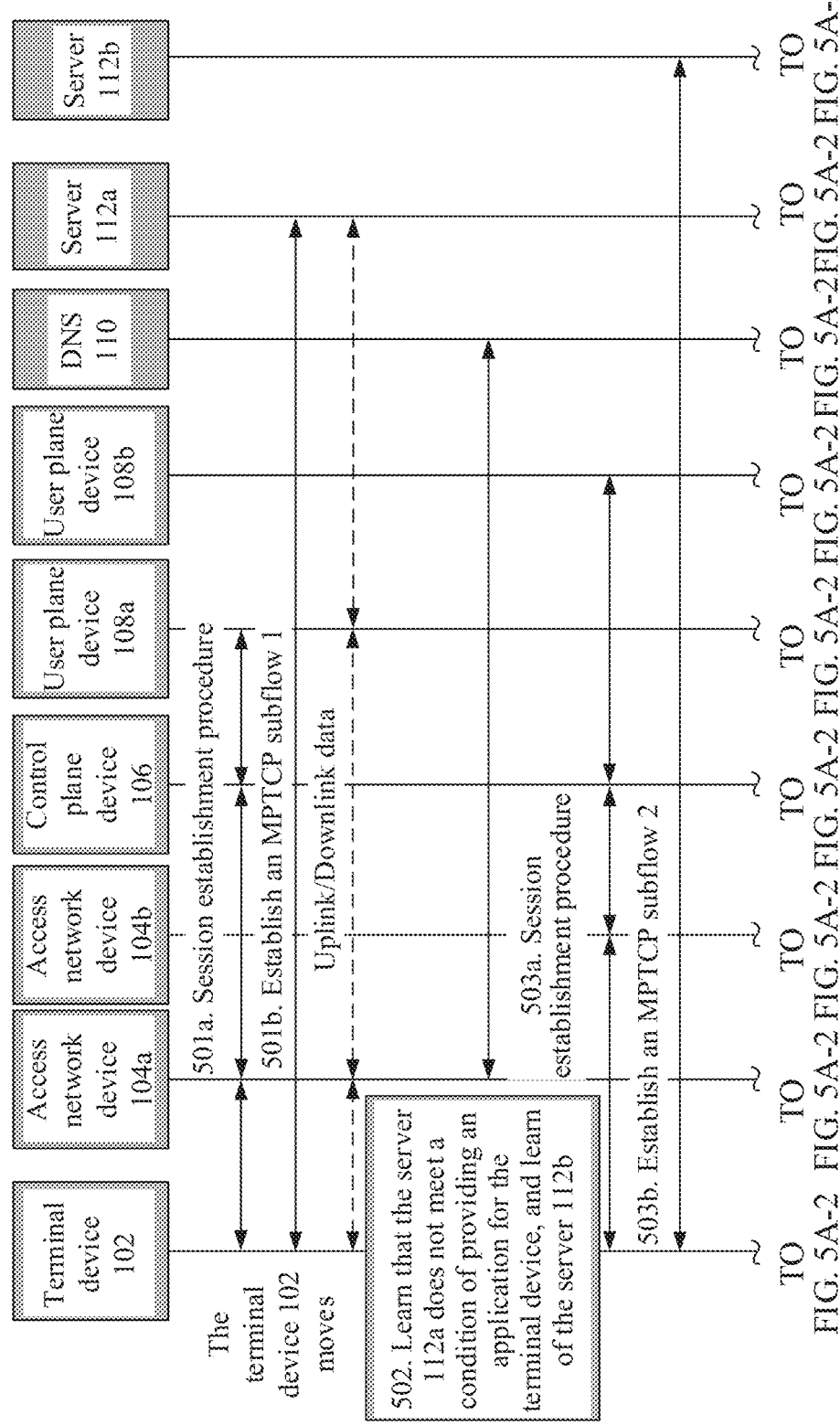

FIG. 5A-1 and FIG. 5A-2 are another signaling flowchart of a data transmission method according to an embodiment of the present invention. For FIG. 5A-1 and FIG. 5A-2, refer to description of FIG. 4A and FIG. 4B. A difference between FIG. 5A-1 and FIG. 5A-2 and FIG. 4A and FIG. 4B is as follows: In the example of FIG. 4A and FIG. 4B, the terminal device 102 performs data transmission with the server 112*a* or the server 112*b* through a TCP connection. However, in an example of FIG. 5A-1 and FIG. 5A-2, the terminal device 102 performs data transmission with the server 112*a* or the server 112*b* by using a subflow of an MPTCP connection. As shown in FIG. 5A-1 and FIG. 5A-2, the method includes the following steps.

Step 501*a*: Execute a session establishment procedure to establish a session between the terminal device 102 and a user plane device 108*a*. For example, the session establishment procedure relates to interaction between the terminal device 102, an access network device 104*a*, a control plane device 106, and the user plane device 108*a*. In this process, an IP address 1 is allocated to the terminal device 102.

Step 501*b*: Establish an MPTCP subflow 1 between the terminal device 102 and the server 112*a*.

Figure 5B:
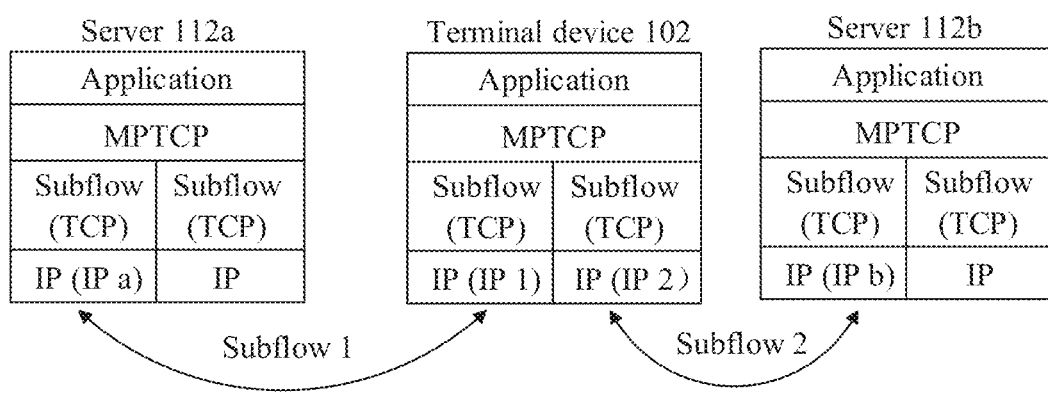
FIG. 5B is a schematic diagram of transmitting data of an application by using MPTCP according to an embodiment of this application.

MPTCP is an improved protocol of TCP, and allows one TCP connection to use a plurality of paths to transmit data. As shown in FIG. 5B, in an MPTCP technology, isolation between an application layer and a transport layer is implemented by adding an additional MPTCP sublayer to a TCP layer. A user may dynamically establish a plurality of subflows to implement multipath transmission and load balancing of an application layer service at the transport layer. MPTCP supports packet retransmission across subflows: If one subflow is abnormally disabled, MPTCP allows a packet of the subflow to be sent in another subflow.

For example, MPTCP connection initialization needs to be first performed to establish the MPTCP subflow 1. For example, the server 112*a* has an IP address a. The MPTCP subflow 1 may be established by using the terminal device 102 (an IP address 1) and the server 112*a* (the IP address a), as shown in FIG. 5B. After the MPTCP subflow 1 between the terminal device 102 and the server 112*a* is established, the terminal device 102 may transmit uplink data and/or downlink data of an application with the server 112*a*.

Step 502: After the terminal device 102 moves from a first area to a second area, the terminal device 102 learns of that the server 112*a* does not meet a condition of providing the application for the terminal device, and learns of the server 112*b* that can provide the application for the terminal device.

For step 502, refer to description of step 202 in FIG. 2. Details are not described herein again.

Step 503*a*: Execute the session establishment procedure to establish the session between the terminal device 102 and a user plane device 108*b*. In this process, an IP address 2 is allocated to the terminal device 102.

Step 503*b*: Establish an MPTCP subflow 2 between the terminal device 102 and the server 112*b*.

For example, in the foregoing step 502 (refer to description of step 202 in FIG. 2), the terminal device 102 learns of, by querying a DNS, the server 112*b* that can provide the application for the terminal device, and obtains address information of the server 112*b*. For example, the server 112*b* has an IP address b. In this way, the terminal device 102 may establish the MPTCP subflow 2 between the terminal device 102 and the server 112*b* based on the newly allocated IP address 2 and the IP address b of the server 112*b*, as shown in FIG. 5B.

Step 504: The terminal device 102 sends a FIN message to the server 112*a*, where the FIN message is used to instruct the server 112*a* to stop sending downlink data of the application to the terminal device 102.

Correspondingly, in step 505, after receiving the FIN message, the server 112*a* stops sending the downlink data of the application to the terminal device 102, and buffers downlink data to be sent to the terminal device 102.

Step 506: The server 112*a* sends an ACK message carrying first indication information to the terminal device 102, where the first indication information is used to indicate an MPTCP sequence number of uplink data that is of the application and that has been received by the server 112*a* from the terminal device 102. Correspondingly, the terminal device 102 receives, from the server 112*a*, the ACK message carrying the first indication information.

Step 507: The server 112*a* sends a FIN message to the terminal device 102, where the FIN message is used to instruct the terminal device 102 to stop sending the uplink data of the application to the server 112*a*.

Correspondingly, in step 508, after receiving the FIN message, the terminal device 102 stops sending the uplink data of the application to the server 112*a*, and buffers uplink data to be sent to the server 112*a*.

Step 509: The terminal device 102 sends an ACK message carrying second indication information to the server 112*a*, where the second indication information is used to indicate an MPTCP sequence number of the downlink data that is of the application and that has been received by the terminal device 102 from the server 112*a*. Correspondingly, the server 112*a* receives, from the terminal device 102, the ACK message carrying the second indication information.

Step 510: The server 112*a* synchronizes a context with the server 112*b*.

Step 511: After context synchronization is completed, the server 112*a* or the server 112*b* sends an SYN message to UE. That the server 112*a* sends the SYN message in FIG. 5A-2 is used as an example. A similar case is applied to that the server 112*b* sends the SYN message to the UE, and this is not shown in the figure.

Step 512: After receiving the SYN message, the terminal device 102 transmits data of the application based on the first indication information and the second indication information through the MPTCP subflow 2 established in step 503*b*.

For step 504 to step 512, refer to description of step 204 to step 210 in FIG. 2. Details are not described herein again.

In the example of FIG. 5A-1 and FIG. 5A-2, after the terminal device 102 moves and learns of that the server 112*a* does not meet the condition of providing the application for the terminal device 102, the terminal device 102 learns of the second server that can provide the application for the terminal device. In addition, the terminal device 102 and the server 112*a* provide a sequence number of received data of the application for each other through interaction. After the new MPTCP subflow 2 is established between the terminal device 102 and the second server 112*b*, the terminal device 102 may transmit the data of the application through the new MPTCP subflow 2 based on the obtained data sequence number of the application. In this way, the application provided by the source server 112*a* may be migrated to the target server 112*b*. In addition, in data transmission of the application performed through the new MPTCP subflow 2, because the sequence number of data that is of the application and that has been received by the terminal device 102 and the sequence number of data that is of the application and that has been received by the first server 112*a* are considered, service continuity can be ensured, and user experience of the terminal device is improved.

In addition, in the MPTCP technology, the terminal device transmits, before the server is switched, the data of the application with the server 112*a* by using the subflow 1. The MPTCP technology allows: If the MPTCP subflow 1 is disabled, a packet of the MPTCP subflow 1 is sent in the MPTCP subflow 2. Therefore, after the server is switched, the terminal device may transmit the data of the application with the server 112*b* by using the subflow 2, thereby reducing signaling interaction and saving network resources.

Figure 6A:
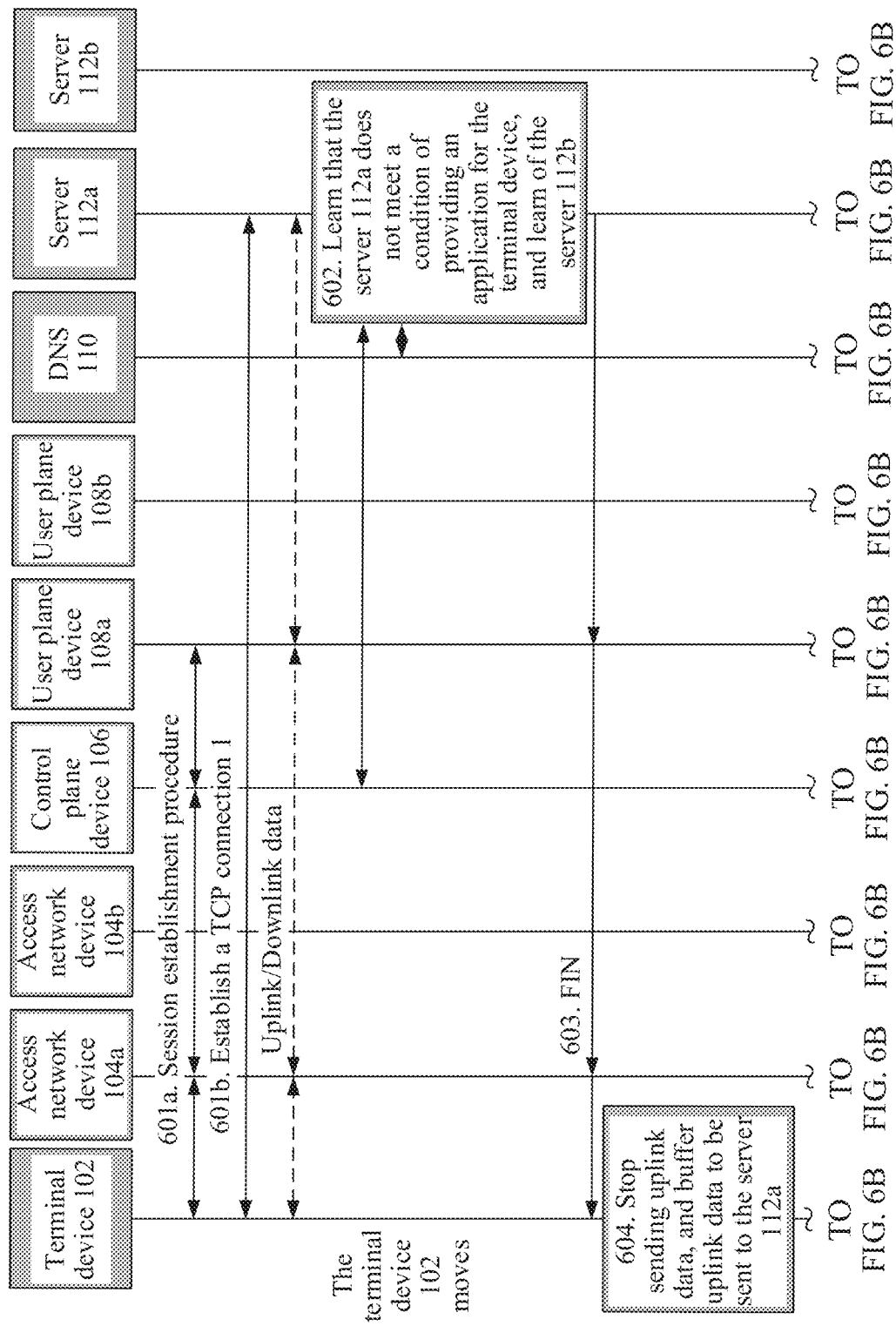
FIG. 6A and FIG. 6B and FIG. 7A and FIG. 7B are diagrams of signaling interaction of a data transmission method according to an embodiment of this application.
Figure 6B:
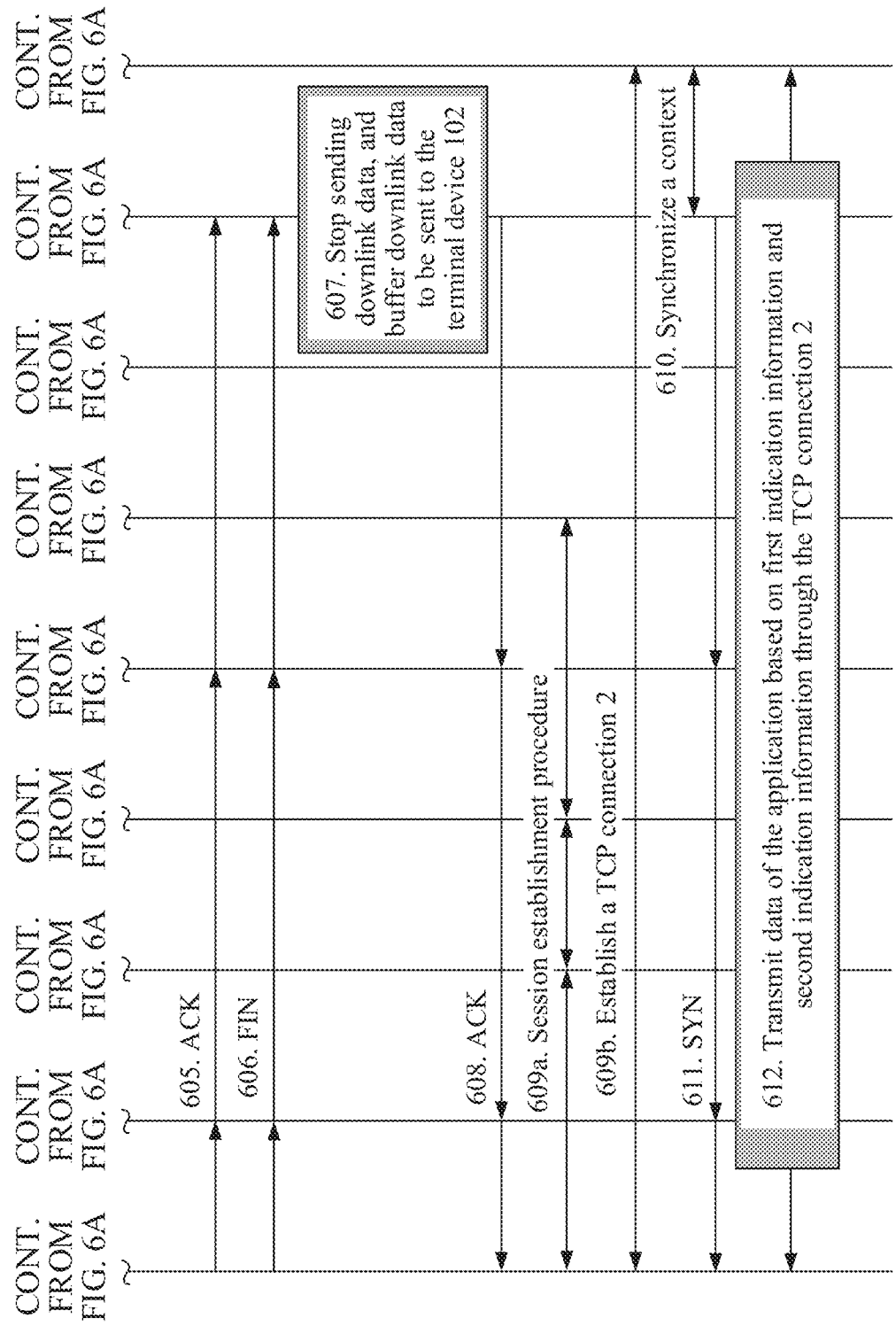

FIG. 6A and FIG. 6B are a signaling flowchart of a data transmission method according to an embodiment of the present invention. As shown in FIG. 6A and FIG. 6B, the method includes the following steps.

Step 601*a*: Execute a session establishment procedure to establish a session (which is also referred to as a PDU session) between a terminal device 102 and a user plane device 108*a*.

Step 601*b*: Establish a TCP connection 1 between the terminal device 102 and a server 112*a*. After the TCP connection 1 between the terminal device 102 and the server 112*a* is established, the terminal device 102 may transmit uplink data and/or downlink data of an application with the server 112*a*.

Step 602: After the terminal device 102 moves from a first area to a second area, the server 112*a* learns of that the server 112*a* does not meet a condition of providing the application for the terminal device, and learns of a server 112*b* that can provide the application for the terminal device.

Step 603. The server 112*a* sends a FIN message to the terminal device 102, where the FIN message is used to instruct the terminal device 102 to stop sending the uplink data of the application to the server 112*a*.

Correspondingly, in step 604, after receiving the FIN message, the terminal device 102 stops sending the uplink data of the application to the server 112*a*, and buffers uplink data to be sent to the server 112*a*.

Step 605: The terminal device 102 sends an ACK message carrying first indication information to the server 112*a*, where the first indication information is used to indicate a TCP sequence number of the downlink data that is of the application and that has been received by the terminal device 102 from the server 112*a*. Correspondingly, the server 112*a* receives, from the terminal device 102, the ACK message carrying the first indication information.

Step 606: The terminal device 102 sends a FIN message to the server 112*a*, where the FIN message is used to instruct the server 112*a* to stop sending the downlink data of the application to the terminal device 102.

Correspondingly, in step 607, after receiving the FIN message, the server 112*a* stops sending the downlink data of the application to the terminal device 102, and buffers downlink data to be sent to the terminal device 102.

Step 608: The server 112*a* sends an ACK message carrying second indication information to the terminal device 102, where the second indication information is used to indicate a TCP sequence number of the uplink data that is of the application and that has been received by the server 112*a* from the terminal device 102. Correspondingly, the terminal device 102 receives, from the server 112*a*, the ACK message carrying the second indication information.

For step 602 to step 608, refer to description of step 302 to step 308 in FIG. 3. Details are not described herein again.

Step 609*a*: Execute the session establishment procedure to establish the session between the terminal device 102 and a user plane device 108*b*.

Step 609*b*: Establish a TCP connection 2 between the terminal device 102 and the server 112*b*.

For example, before establishing the TCP connection 2 between the terminal device 102 and the server 112*b*, the terminal device 102 needs to first learn of address information of the server 112*b*. In an implementation, when the second indication information carries the address information of the server 112*b*, the terminal device 102 learns of the address information of the server 112*b* from the received second indication information. In another implementation, the terminal device 102 may alternatively query a DNS after receiving a first message, to learn of that the server 112*b* can provide the application and to obtain the address information of the server 112*b*. In this way, the terminal device 102 may establish the TCP connection 2 between the terminal device 102 and the server 112*b* based on the address information of the server 112*b*. Optionally, in the foregoing step 609*a*, in a session establishment process, a new IP address is allocated to the terminal device 102. In this case, the terminal device 102 may establish the TCP connection 2 between the terminal device 102 and the server 112*b* based on the newly allocated IP address and the address information of the server 112*b*.

Step 610: The server 112*a* synchronizes a context of the terminal device with the server 112*b*.

Step 611: After context synchronization is completed, the server 112*a* or the server 112*b* sends an SYN message to UE. That the server 112*a* sends the SYN message in FIG. 6B is used as an example. A similar case is applied to that the server 112*b* sends the SYN message to the UE, and this is not shown in the figure.

Step 612: After receiving the SYN message, the terminal device 102 transmits data of the application based on the first indication information and the second indication information through the connection established in step 609*b*.

For step 610 to step 612, refer to description of step 309*b* to step 310 in FIG. 3. Details are not described herein again.

Figure 7A:
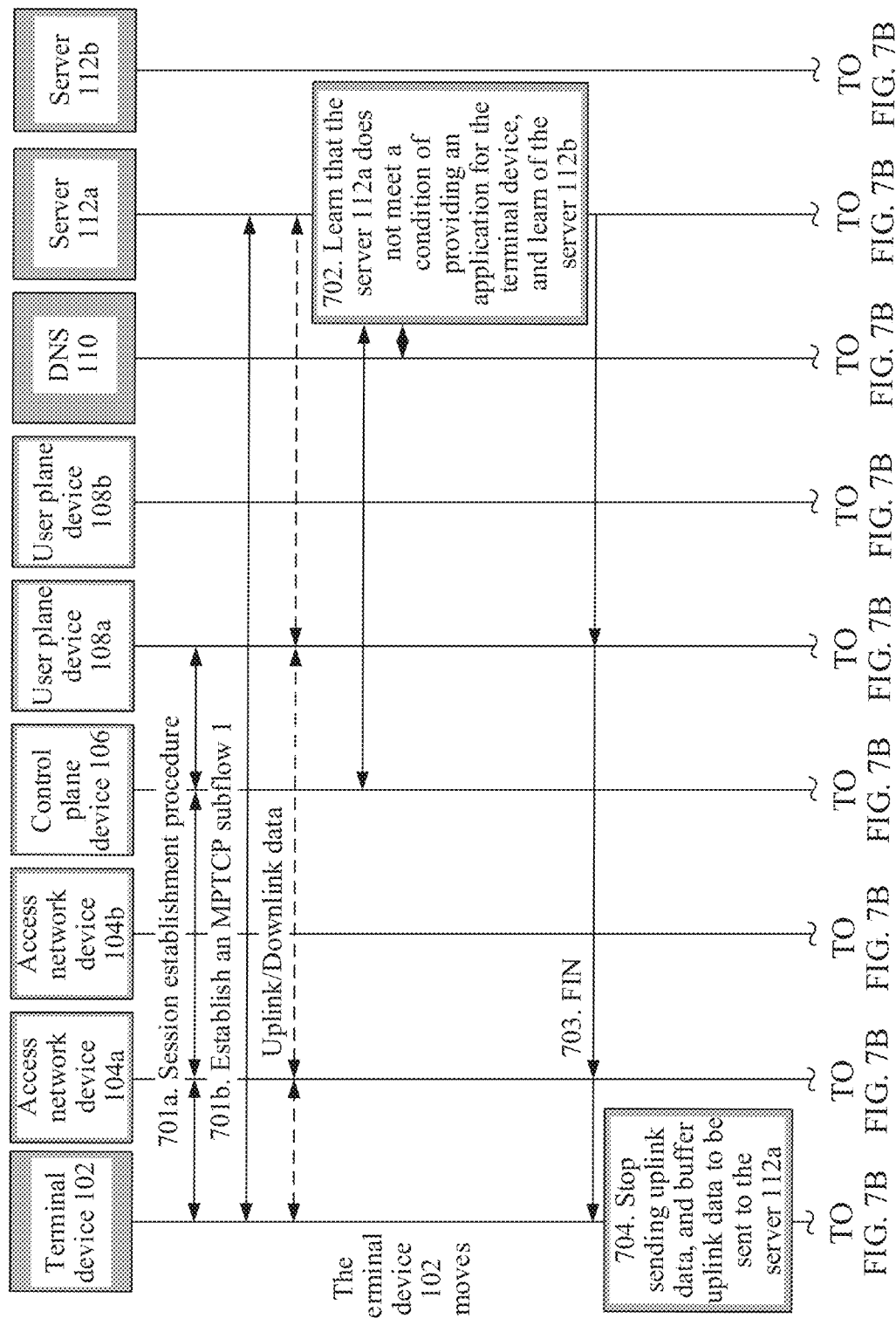
Figure 7B:
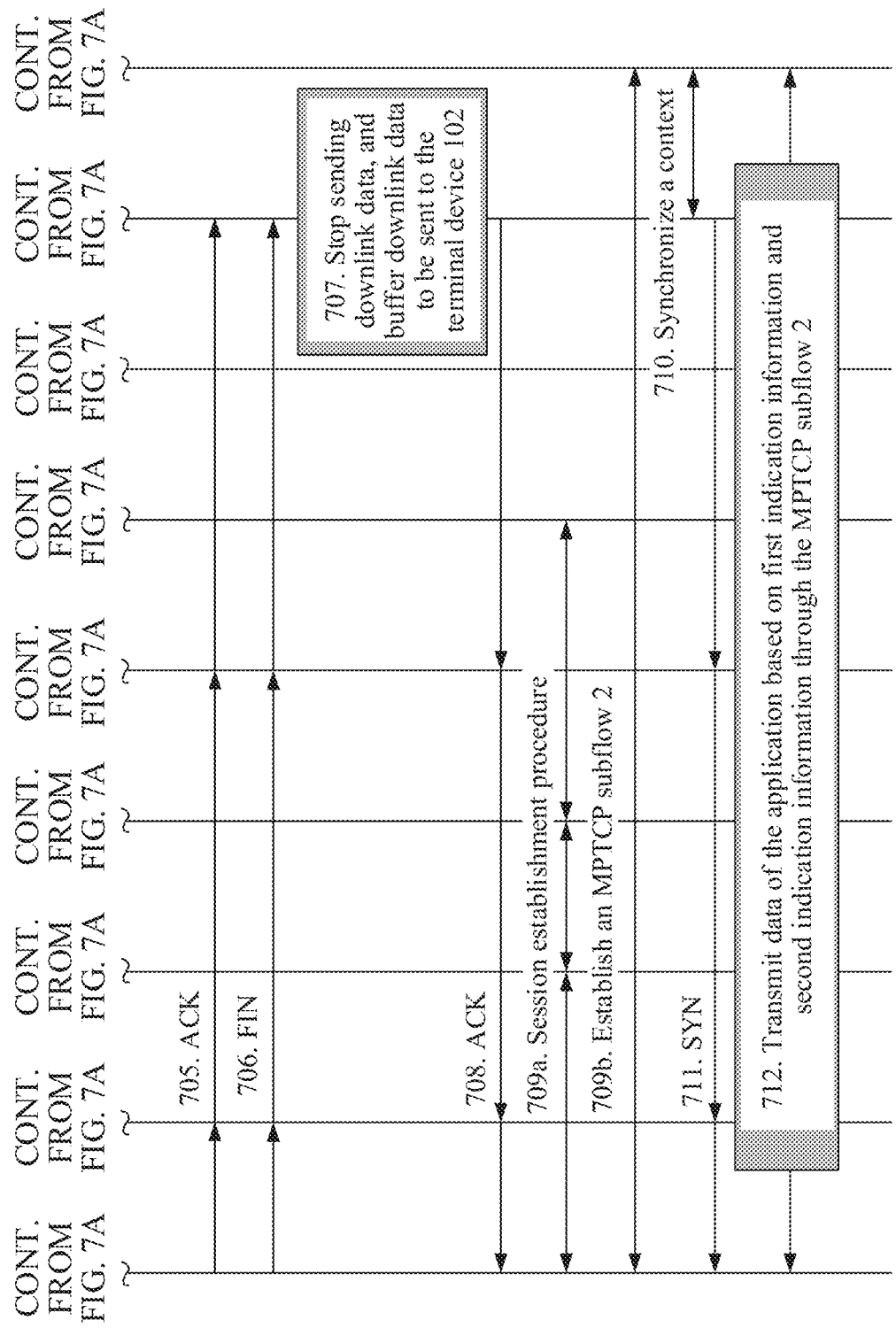

FIG. 7A and FIG. 7B are another signaling flowchart of a data transmission method according to an embodiment of the present invention. For FIG. 7A and FIG. 7B, refer to description of FIG. 6A and FIG. 6B. A difference between FIG. 7A and FIG. 7B and FIG. 6A and FIG. 6B is as follows: In the example of FIG. 6A and FIG. 6B, the terminal device 102 performs data transmission with the server 112a or the server 112b through a TCP connection. However, in an example of FIG. 7A and FIG. 7B, the terminal device 102 performs data transmission with the server 112a or the server 112b by using a subflow of an MPTCP connection. As shown in FIG. 7A and FIG. 7B, the method includes the following steps.

Step 701a: Execute a session establishment procedure to establish a session between the terminal device 102 and a user plane device 108a. For example, in this process, an IP address 1 is allocated to the terminal device 102.

Step 701b: Establish an MPTCP subflow 1 between the terminal device 102 and the server 112a.

MPTCP connection initialization needs to be first performed to establish the MPTCP subflow 1. For example, the server 112a has an IP address a. The MPTCP subflow 1 is established by using the terminal device 102 (the IP address 1) and the server 112a (the IP address a), as shown in FIG. 5B. After the MPTCP subflow 1 between the terminal device 102 and the server 112a is established, the terminal device 102 may transmit uplink data and/or downlink data of an application with the server 112a.

Step 702: After the terminal device 102 moves from a first area to a second area, the server 112a learns of that the server 112a does not meet a condition of providing an application for the terminal device, and learns of the server 112b that can provide the application for the terminal device.

Step 703: The server 112a sends a FIN message to the terminal device 102, where the FIN message is used to instruct the terminal device 102 to stop sending the uplink data of the application to the server 112a.

Correspondingly, in step 704, after receiving the FIN message, the terminal device 102 stops sending the uplink data of the application to the server 112a, and buffers uplink data to be sent to the server 112a.

Step 705: The terminal device 102 sends an ACK message carrying first indication information to the server 112a, where the first indication information is used to indicate an MPTCP sequence number of the downlink data that is of the application and that has been received by the terminal device 102 from the server 112a. Correspondingly, the server 112a receives, from the terminal device 102, the ACK message carrying the first indication information.

Step 706: The terminal device 102 sends a FIN message to the server 112a, where the FIN message is used to instruct the server 112a to stop sending the downlink data of the application to the terminal device 102.

Correspondingly, in step 707, after receiving the FIN message, the server 112a stops sending the downlink data of the application to the terminal device 102, and buffers downlink data to be sent to the terminal device 102.

Step 708: The server 112a sends an ACK message carrying second indication information to the terminal device 102, where the second indication information is used to indicate an MPTCP sequence number of the uplink data that is of the application and that has been received by the server 112a from the terminal device 102. Correspondingly, the terminal device 102 receives, from the server 112a, the ACK message carrying the second indication information.

For step 702 to step 708, refer to description of step 302 to step 308 in FIG. 3. Details are not described herein again.

Step 709a: Execute the session establishment procedure to establish the session between the terminal device 102 and the user plane device 108b. In this process, an IP address 2 is allocated to the terminal device 102.

Step 709b: Establish an MPTCP subflow 2 between the terminal device 102 and the server 112b.

For example, before establishing the MPTCP subflow 2 between the terminal device 102 and the server 112b, the terminal device 102 first learns of address information of the server 112b. In an implementation, when the second indication information carries the address information of the server 112b, the terminal device 102 learns of the address information of the server 112b from the received second indication information. In another implementation, the terminal device 102 may alternatively query a DNS after receiving a first message, to learn of that the server 112b can provide the application and to obtain the address information of the server 112b. For example, the server 112b has an IP address b. In this way, the terminal device 102 may establish the MPTCP subflow 2 between the terminal device 102 and the server 112b based on the newly allocated IP address 2 and the IP address b of the server 112b, as shown in FIG. 5B.

Step 710: The server 112a synchronizes a context of the terminal device with the server 112b.

Step 711: After context synchronization is completed, the server 112a or the server 112b sends an SYN message to UE. That the server 112a sends the SYN message in FIG. 7B is used as an example. A similar case is applied to that the server 112b sends the SYN message to the UE, and this is not shown in the figure.

Step 712: After receiving the SYN message, the terminal device 102 transmits data of the application based on the first indication information and the second indication information through the MPTCP subflow 2 established in step 709b.

For step 710 to step 712, refer to description of step 309b to step 310 in FIG. 3. Details are not described herein again.

In the foregoing embodiments provided in this application, solutions such as the data transmission method provided in the embodiments of this application are described from perspectives of each network element and interaction between network elements. It may be understood that, to implement the foregoing function, each network element such as the first device or the second device includes a corresponding hardware structure and/or software module that is used to perform each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 8A:
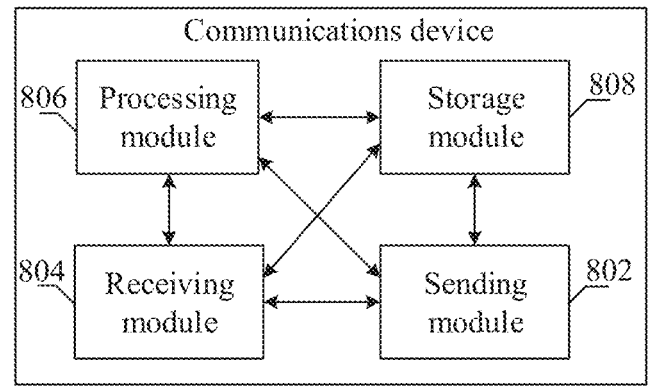
FIG. 8A and FIG. 8B are schematic structural diagrams of a first device and a second device respectively according to an embodiment of this application.

For example, when the foregoing network element implements a corresponding function by using a software module, a communications device may include a sending module 802 and a receiving module 804, as shown in FIG. 8A.

In an embodiment, the sending module 802 is configured to send a first message to a second device, where the first message is used to instruct the second device to stop sending data of an application to the communications device. The receiving module 804 is configured to receive first indication information from the second device, where the first indication information is used to indicate a sequence number of data that is of the application and that has been received by the second device from the communications device. The sending module 802 is further configured to send second indication information to the second device, where the second indication information is used to indicate a sequence number of data that is of the application and that has been received by the communications device from the second device. After a connection between the terminal device and a second server is established, the first indication information and the second indication information are used to transmit the data of the application through the connection.

In addition, the communications device further includes a processing module 806, configured to: learn of that the first server does not meet a condition of providing the application for the terminal device, and learn of the second server that can provide the application for the terminal device. For example, the processing module 806 is configured to query a domain name system DNS to learn of that the second server can provide the application and to obtain address information of the second server.

In addition, the communications device further includes a storage module 808, configured to: after the processing module 806 learns of that the first server does not meet the condition of providing the application for the terminal device, buffer data to be sent to the second device. In addition, the storage module may further store various instructions.

The communications device in FIG. 8A is the first device in FIG. 2 or FIG. 3.

If the communications device is the terminal device and the second device is the first server, the communications device may be further configured to perform various steps of the terminal device 102 in FIG. 2, FIG. 4A and FIG. 4B, or FIG. 5A-1 and FIG. 5A-2. For example, the receiving module 804 is further configured to receive a second message from the first server or the second server, where the second message is used to trigger the terminal device to transmit the data of the application with the second server through the connection based on the first indication information and the second indication information.

If the communications device is the first server and the second device is the terminal device, the communications device may be further configured to perform various steps of the server 112a in FIG. 3, FIG. 6A and FIG. 6B, or FIG. 7A and FIG. 7B. For example, the processing module 806 is further configured to synchronize a context of the terminal device with the second server, where the context of the terminal device includes the first indication information and the second indication information.

Figure 8B:
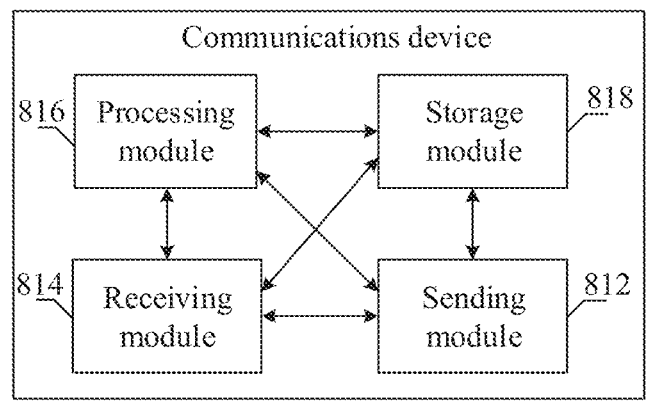

In addition, this application further discloses a communications device, namely, the foregoing second device, as shown in FIG. 8B. The communications device includes a sending module 812, a receiving module 814, and a processing module 816.

In an embodiment, the receiving module 814 is configured to receive a first message from a first device, where the first message is used to instruct the communications device to stop sending data of an application to the first device. The processing module 816 is configured to control the sending module to stop sending the data of the application to the first device. The sending module 812 is configured to send first indication information to the first device, where the first indication information is used to indicate a sequence number of data that is of the application and that has been received by the communications device from the first device. The receiving module 814 is further configured to receive second indication information from the first device, where the second indication information is used to indicate a sequence number of data that is of the application and that has been received by the first device from the communications device. After a connection between the terminal device and a second server is established, the first indication information and the second indication information are used to transmit the data of the application through the connection.

In addition, the communications device further includes a storage module 818, configured to buffer data to be sent to the first device. In addition, the storage module 818 may further store various instructions.

In addition, the processing module 816 is further configured to learn of address information of the second server from the second indication information; or after the communications device receives the first message, the processing module 816 is configured to query a domain name system DNS, to learn that the second server can provide the application for the terminal device and to obtain the address information of the second server.

The communications device in FIG. 8B is the second device in FIG. 2 or FIG. 3.

If the first device is the terminal device and the communications device is the first server, the communications device may be further configured to perform various steps of the server 112a in FIG. 2, FIG. 4A and FIG. 4B, or FIG. 5A-1 and FIG. 5A-2. For example, the processing module 816 is further configured to synchronize a context of the terminal device with the second server, where the context of the terminal device includes the first indication information and the second indication information. The sending module 812 is further configured to send a second message to the terminal device, where the second message is used to trigger the terminal device to transmit the data of the application with the second server through the connection.

If the first device is the first server and the communications device is the terminal device, the communications device may be further configured to perform various steps of the terminal device 102 in FIG. 3, FIG. 6A and FIG. 6B, or FIG. 7A and FIG. 7B. For example, the receiving module 814 is further configured to receive a second message from the first server or the second server, where the second message is used to trigger the terminal device to transmit the data of the application with the second server through the connection.

Figure 9A:
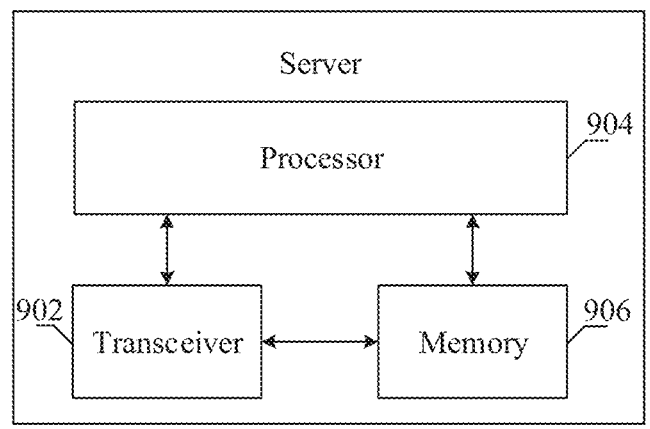
FIG. 9A and FIG. 9B are schematic structural diagrams of a server and a terminal device respectively according to an embodiment of this application.

FIG. 9A is a schematic structural diagram of a server in the foregoing embodiments. The server includes a transceiver 902 and a processor 904. For example, the server 112a may be implemented by the server in FIG. 9A. The processor 904 is configured to perform a corresponding function of the server 112a in the foregoing method. The transceiver 902 is configured to implement communication between the server 112a and the foregoing terminal device/control plane device 106/DNS 110. The server may further include a memory 906, where the memory is configured to couple to the processor, and stores a program instruction and data that are necessary for a communications device.

It may be understood that FIG. 9A merely shows a simplified design of the foregoing device. In actual application, each of the foregoing devices may include any quantity of transmitters, receivers, processors, controllers, memories, communications units, and the like, and all devices that may implement this application fall within the protection scope of this application.

Figure 9B:
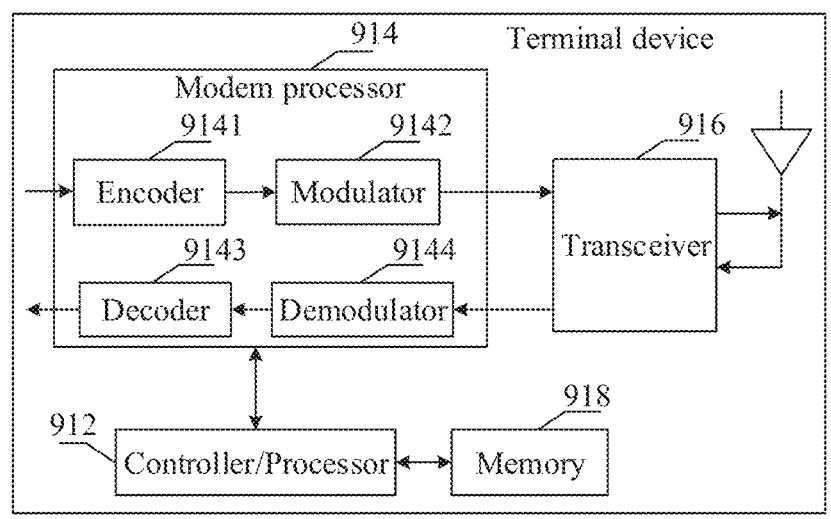

FIG. 9B is a simplified schematic diagram of a possible design structure of a terminal device in the foregoing embodiments. For example, the foregoing terminal device 102 may be implemented by the terminal device in FIG. 9B. The terminal device includes a transceiver 916, a controller/processor 912, and may further include a memory 918 and a modem processor 914. The transceiver 916 adjusts (for example, through analog conversion, filtering, amplification, and up-conversion) the output sampling and generates an uplink signal. The uplink signal is transmitted to the base station in the foregoing embodiment by an antenna. In a downlink, the antenna receives a downlink signal transmitted by the base station in the foregoing embodiment. The transceiver 916 adjusts (for example, through filtering, amplification, down-conversion, and digitization) a signal received from the antenna and provides an input sampling. In the modem processor 914, an encoder 9141 receives service data and a signaling message to be sent in the uplink, and processes (for example, through formatting, coding, and interleaving) the service data and the signaling message. A modulator 9142 further processes (for example, through symbol mapping and modulation) the service data and the signaling message that are encoded, and provides an output sampling. A demodulator 9144 processes (for example, through demodulation) the input sampling and provides symbol estimation. A decoder 9143 processes (for example, through de-interleaving and decoding) the symbol estimation and provides the data and the signaling message that are decoded and that are sent to the terminal device. The encoder 9141, the modulator 9142, the demodulator 9144, and the decoder 9143 may be implemented by the composite modem processor 914. These units perform processing based on a radio access technology (for example, an access technology of LTE or another evolution system) used by a radio access network. The controller/processor 912 performs control management on actions of the terminal device, and is configured to perform processing that is performed by the terminal device 102 in the foregoing embodiment.

The controller/processor configured to perform the foregoing server and terminal device in this application may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

Method or algorithm steps described in combination with the content disclosed in this application may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

All or some of the foregoing embodiments may be implemented by using software, hardware, firmware, or any combination thereof. When software is used to implement the embodiments, the embodiments may be implemented in whole or in part in a form of a computer program product. The computer program product includes one or more computer instructions. When the computer program instructions are loaded and executed on the computer, the procedure or functions according to the embodiments of the present invention are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement or improvement made based on technical solutions of this application shall fall within the protection scope of this application.

What is claimed is:

1. A data transmission method, comprising:
learning of, by a first server, that the first server does not meet a condition of providing an application for a terminal device;
in response to at least the learning of that the first server does not meet the condition of providing the application for the terminal device, transmitting, by the first server, a message instructing the terminal device to stop sending additional data of the application to the first server;
receiving, by the first server, first indication information indicating a sequence number of data that is of the application and that has been received by the terminal device from the first server; and
synchronizing, by the first server, a context of the terminal device with a second server.

2. The method according to claim 1, further comprising:
transmitting to the terminal device, by the first server, second indication information indicating a sequence number of data that is of the application and that has been received by the first server from the terminal device.

3. The method according to claim 1, further comprising:
learning of, by the first server, the second server that provides the application for the terminal device.

4. The method according to claim 1, wherein the condition comprises at least one of the following conditions:

a delay of transmitting the data of the application between the terminal device and a server is less than or equal to a first value; or a packet loss rate of transmitting the data of the application between the terminal device and a server is less than or equal to a second value.

5. The method according to claim 3, wherein the learning of, by the first server, the second server that provides the application for the terminal device comprises:

querying, by the first server, a domain name system to learn of that the second server provides the application and to obtain address information of the second server.

6. An apparatus of a communications device, comprising:
at least one processor; and
one or more memories coupled to the at least one processor and storing programming instructions for execution by the at least one processor to:
learn of that the communications device does not meet a condition of providing an application for a terminal device;
in response to at least the learning of that the communications device does not meet the condition of providing the application for the terminal device, transmit, to the terminal device, a message instructing the terminal device to stop sending additional data of the application to the communications device;
receive first indication information indicating a sequence number of data that is of the application and that has been received by the terminal device from the communications device; and
synchronizing a context of the terminal device with a second server.

7. The apparatus of the communications device according to claim 6, wherein the programming instructions are for execution by the at least one processor to transmit, to the terminal device, second indication information indicating a sequence number of data that is of the application and that has been received by the communications device from the terminal device.

8. The apparatus of the communications device according to claim 6, wherein the programming instructions are for execution by the at least one processor to:
learn of the second server that provides the application for the communications device.

9. The apparatus of the communications device according to claim 6, wherein the condition comprises at least one of the following conditions:
a delay of transmitting the data of the application between the apparatus of the communications device and a server is less than or equal to a first value; or
a packet loss rate of transmitting the data of the application between the apparatus of the communications device and a server is less than or equal to a second value.

10. The apparatus of the communications device according to claim 8, wherein the programming instructions are for execution by the at least one processor to queue a domain name system to learn of that the second server provides the application and to obtain address information of the second server.

11. A non-transitory computer-readable medium, storing computer instructions for execution by one or more processors, wherein the computer instructions instruct the one or more processors to perform operations comprising:
learning of that a first server does not meet a condition of providing an application for a terminal device;
in response to at least the learning of that the first server does not meet the condition of providing the application for the terminal device, transmitting, to the terminal device, a message instructing the terminal device to stop sending additional data of the application to the first server;
receiving first indication information indicating a sequence number of data that is of the application and that has been received by the terminal device from the first server; and
synchronizing a context of the terminal device with a second server.

12. The non-transitory computer-readable medium according to claim 11, the operations further comprising:
transmitting, to the terminal device, second indication information indicating a sequence number of data that is of the application and that has been received by the first server from the terminal device.

13. The non-transitory computer-readable medium according to claim 11, the operations further comprising:
learning of the second server that provides the application for the terminal device.

14. The non-transitory computer-readable medium according to claim 11, wherein the condition comprises at least one of the following conditions:
a delay of transmitting the data of the application between the terminal device and a server is less than or equal to a first value; or
a packet loss rate of transmitting the data of the application between the terminal device and a server is less than or equal to a second value.

15. The non-transitory computer-readable medium according to claim 13, wherein the learning of the second server that provides the application for the terminal device comprises:
querying a domain name system to learn of that the second server provides the application and to obtain address information of the second server.

16. The data transmission method according to claim 1, wherein the context of the terminal device comprises the sequence number.

17. The data transmission method according to claim 1, wherein the context of the terminal device comprises application layer information and transmission status information that are of the terminal device and that are stored in the first server.

18. The data transmission method according to claim 17, wherein
the transmission status information comprises window information and the sequence number.

* * * * *